United States Patent
McQuade et al.

(10) Patent No.: US 10,185,455 B2
(45) Date of Patent: Jan. 22, 2019

(54) MOBILE COMPUTING DEVICE FOR FLEET TELEMATICS

(71) Applicant: ZONAR SYSTEMS, INC., Seattle, WA (US)

(72) Inventors: Charles Michael McQuade, Issaquah, WA (US); Alan Chuang, Kirkland, WA (US); Ron Stieger, Seattle, WA (US)

(73) Assignee: ZONAR SYSTEMS, INC., Seattle, WA (US)

( * ) Notice: Subject to any disclaimer, the term of this patent is extended or adjusted under 35 U.S.C. 154(b) by 621 days.

(21) Appl. No.: 14/046,900

(22) Filed: Oct. 4, 2013

(65) Prior Publication Data

US 2014/0098060 A1 Apr. 10, 2014

Related U.S. Application Data

(60) Provisional application No. 61/709,966, filed on Oct. 4, 2012, provisional application No. 61/710,720, filed on
(Continued)

(51) Int. Cl.
*G06F 3/045* (2006.01)
*G07C 5/08* (2006.01)
(Continued)

(52) U.S. Cl.
CPC ............ *G06F 3/045* (2013.01); *G06F 3/0416* (2013.01); *G07C 5/0858* (2013.01)

(58) Field of Classification Search
CPC ........ G06F 3/045; G06F 11/34; G06F 1/1662; G01M 17/00; H01Q 7/00
(Continued)

(56) References Cited

U.S. PATENT DOCUMENTS 3,990,067 A 11/1976 Van Dusen et al.
4,025,791 A 5/1977 Lennington et al.
(Continued)

FOREIGN PATENT DOCUMENTS

CA 2138378 11/1994
CA 2326892 10/1999
(Continued)

OTHER PUBLICATIONS

"The PenMaster" and "The PSION Workabout." Copyright 2000 GCS General Control Systems. <http://www.gcs.at/eng/produkte/hw/penmaster.htm>.
(Continued)

*Primary Examiner* — Lin Li

(57) ABSTRACT

A mobile computing device for fleet telematics including a display and a controller configured to present at least one telematics application to a user. In an exemplary embodiment, the application is a verified inspection application, and the device includes an RF coil for an RFID reader that substantially extends along a perimeter of a housing for the device. In a related embodiment, the device includes an indicator light disposed along a perimeter edge of the housing, generally adjacent to the RF coil, the indicator light providing a user an indication of how to orient the device in order to enable the RF coil to interact with an RFID tag. The device can be configured such that the indicator light is only enabled when the inspection application is running. The device can include a flashlight and/or a digital camera, where the device is similarly programmed such that the flashlight and/or camera can only be enabled when the inspection application is running.

20 Claims, 6 Drawing Sheets

Figure 1:
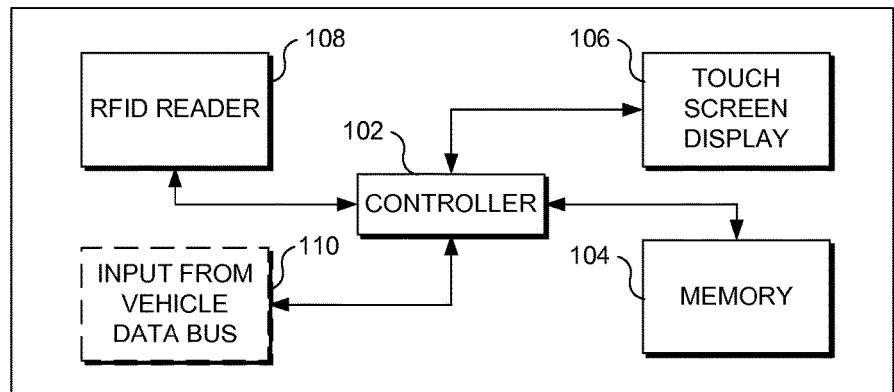

Related U.S. Application Data on Oct. 7, 2012, provisional application No. 61/710,721, filed on Oct. 7, 2012, provisional application No. 61/711,197, filed on Oct. 8, 2012.

(51) Int. Cl.
| | |
|---|---|
| G06Q 10/06 | (2012.01) |
| G06Q 30/06 | (2012.01) |
| G06F 1/16 | (2006.01) |
| B61L 27/00 | (2006.01) |
| B60Q 1/00 | (2006.01) |
| G07C 5/00 | (2006.01) |
| G07B 15/06 | (2011.01) |
| B60K 35/00 | (2006.01) |
| F24F 11/30 | (2018.01) |
| G06F 3/041 | (2006.01) |

(58) Field of Classification Search
USPC ........... 345/156, 174, 173; 701/35; 343/848, 343/702
See application file for complete search history.

(56) References Cited

U.S. PATENT DOCUMENTS

| | | | |
|---|---|---|---|
| 4,258,521 A | 3/1981 | Juhasz et al. | |
| 4,325,057 A | 4/1982 | Bishop | |
| 4,602,127 A | 7/1986 | Neely et al. | |
| 4,688,244 A | 8/1987 | Hannon et al. | |
| 4,750,197 A | 7/1988 | Denekamp et al. | |
| 4,763,356 A | 8/1988 | Day, Jr. et al. | |
| 4,799,162 A | 1/1989 | Shinakawa et al. | |
| 4,897,792 A | 1/1990 | Hosoi | |
| 5,058,044 A | 10/1991 | Stewart et al. | |
| 5,068,656 A | 11/1991 | Sutherland | |
| 5,128,651 A | 7/1992 | Heckart | |
| 5,206,643 A | 4/1993 | Eckelt | |
| 5,223,844 A | 6/1993 | Mansell et al. | |
| 5,243,343 A | 9/1993 | Rogers | |
| 5,321,629 A | 6/1994 | Shirata et al. | |
| 5,394,136 A | 2/1995 | Lammers et al. | |
| 5,399,844 A | 3/1995 | Holland | |
| 5,459,304 A | 10/1995 | Eisenmann | |
| 5,459,660 A | 10/1995 | Berra | |
| 5,499,182 A | 3/1996 | Ousborne | |
| 5,541,845 A | 7/1996 | Klein | |
| 5,546,305 A | 8/1996 | Kondo | |
| 5,557,254 A | 9/1996 | Johnson et al. | |
| 5,557,628 A | 9/1996 | Hughes et al. | |
| 5,572,192 A | 11/1996 | Berube | |
| 5,585,552 A | 12/1996 | Heuston et al. | |
| 5,600,323 A | 2/1997 | Boschini | |
| 5,610,596 A | 3/1997 | Petitclerc | |
| 5,629,678 A | 5/1997 | Gargano et al. | |
| 5,671,158 A | 9/1997 | Fournier et al. | |
| 5,680,328 A | 10/1997 | Skorupski et al. | |
| 5,719,771 A | 2/1998 | Buck et al. | |
| 5,804,937 A | 2/1998 | Barbiaux et al. | |
| 5,731,893 A | 3/1998 | Dominique | |
| 5,754,965 A | 5/1998 | Hagenbuch | |
| 5,758,299 A | 5/1998 | Sandborg et al. | |
| 5,768,382 A | 6/1998 | Schneier et al. | |
| 5,808,565 A | 9/1998 | Matta et al. | |
| 5,839,112 A | 11/1998 | Schreitmueller et al. | |
| 5,874,891 A | 2/1999 | Lowe | |
| 5,942,753 A | 8/1999 | Dell | |
| 5,995,898 A * | 11/1999 | Tuttle | G07B 15/063 427/255.31 |
| 6,043,661 A | 3/2000 | Gutierez | |
| 6,049,755 A | 4/2000 | Lou et al. | |
| 6,054,950 A | 4/2000 | Fontana | |
| 6,078,255 A | 6/2000 | Dividock et al. | |
| 6,092,021 A | 7/2000 | Ehlbeck et al. | |
| 6,107,915 A | 8/2000 | Reavell et al. | |
| 6,107,917 A | 8/2000 | Carrender et al. | |
| 6,128,959 A | 10/2000 | McGovern et al. | |
| 6,169,943 B1 * | 1/2001 | Simon | G07C 5/008 340/901 |
| 6,236,911 B1 | 5/2001 | Kruger | |
| 6,253,129 B1 | 6/2001 | Jenkins | |
| 6,256,579 B1 | 7/2001 | Tanimoto | |
| 6,263,273 B1 | 7/2001 | Henneken et al. | |
| 6,278,928 B1 | 8/2001 | Aruga et al. | |
| 6,370,454 B1 | 4/2002 | Moore | |
| 6,374,176 B1 | 4/2002 | Schmier et al. | |
| 6,396,413 B2 | 5/2002 | Hines et al. | |
| 6,411,891 B1 | 6/2002 | Schick et al. | |
| 6,438,472 B1 | 8/2002 | Tano et al. | |
| 6,450,411 B1 | 9/2002 | Rash et al. | |
| 6,456,039 B1 | 9/2002 | Lauper et al. | |
| 6,505,106 B1 | 1/2003 | Lawrence | |
| 6,529,808 B1 | 3/2003 | Diem | |
| 6,539,296 B2 | 3/2003 | Diaz et al. | |
| 6,594,621 B1 | 6/2003 | Meeker | |
| 6,597,973 B1 | 7/2003 | Barich et al. | |
| 6,614,392 B2 | 9/2003 | Howard | |
| 6,664,897 B2 | 12/2003 | Pape et al. | |
| 6,671,646 B2 | 12/2003 | Manegold et al. | |
| 6,708,113 B1 | 3/2004 | Von Gerlach et al. | |
| 6,735,542 B1 | 5/2004 | Burgett et al. | |
| 6,801,901 B1 | 10/2004 | Ng | |
| 6,804,626 B2 | 10/2004 | Manegold et al. | |
| 6,834,259 B1 | 12/2004 | Markwitz et al. | |
| 6,847,887 B1 | 1/2005 | Casino | |
| 6,856,897 B1 | 2/2005 | Phuyal | |
| 6,894,617 B2 | 5/2005 | Richman | |
| 6,909,947 B2 | 7/2005 | Douros et al. | |
| 7,027,955 B2 | 4/2006 | Markwitz et al. | |
| 7,035,733 B1 | 4/2006 | Alwar et al. | |
| 7,048,185 B2 | 5/2006 | Hart et al. | |
| 7,103,460 B1 | 9/2006 | Breed | |
| 7,174,243 B1 | 2/2007 | Lightner et al. | |
| 7,174,277 B2 | 2/2007 | Vock et al. | |
| 7,184,866 B2 | 2/2007 | Squires et al. | |
| 7,254,516 B2 | 8/2007 | Case, Jr. et al. | |
| 7,424,414 B2 * | 9/2008 | Craft | G07C 5/08 434/65 |
| 7,692,552 B2 | 4/2010 | Harrington et al. | |
| 8,577,703 B2 | 11/2013 | McClellan et al. | |
| 8,604,920 B2 | 12/2013 | Armitage et al. | |
| 8,694,328 B1 * | 4/2014 | Gormley | G06Q 30/0621 705/1.1 |
| 8,849,501 B2 | 9/2014 | Cook et al. | |
| 8,918,229 B2 | 12/2014 | Hunt | |
| 8,930,040 B2 | 1/2015 | Gompert et al. | |
| 8,996,287 B2 | 3/2015 | Davidson et al. | |
| 2001/0047283 A1 | 11/2001 | Melick et al. | |
| 2001/0053983 A1 | 12/2001 | Reichwein et al. | |
| 2002/0016655 A1 | 2/2002 | Joao | |
| 2002/0022979 A1 | 2/2002 | Whipp et al. | |
| 2002/0022984 A1 | 2/2002 | Daniel et al. | |
| 2002/0065698 A1 | 5/2002 | Schick et al. | |
| 2002/0104323 A1 * | 8/2002 | Rash | F24F 11/30 62/176.1 |
| 2002/0107833 A1 | 8/2002 | Kerkinni | |
| 2002/0107873 A1 | 8/2002 | Winkler et al. | |
| 2002/0111725 A1 | 8/2002 | Burge | |
| 2002/0116122 A1 | 8/2002 | Satonaka | |
| 2002/0122583 A1 | 9/2002 | Thompson | |
| 2002/0133273 A1 | 9/2002 | Lowrey et al. | |
| 2002/0133275 A1 | 9/2002 | Thibault | |
| 2002/0147610 A1 | 10/2002 | Tabe | |
| 2002/0150050 A1 | 10/2002 | Nathanson | |
| 2002/0156558 A1 | 10/2002 | Hanson et al. | |
| 2002/0163449 A1 | 11/2002 | Flick | |
| 2002/0165669 A1 | 11/2002 | Pinto et al. | |
| 2002/0178147 A1 | 11/2002 | Arroyo et al. | |
| 2002/0188593 A1 | 12/2002 | Moser et al. | |
| 2003/0030550 A1 | 2/2003 | Talbot | |
| 2003/0033061 A1 | 2/2003 | Chen et al. | |
| 2003/0033071 A1 | 2/2003 | Kawasaki | |
| 2003/0048257 A1 * | 3/2003 | Mattila | H04M 1/0214 345/169 |

(56) References Cited

U.S. PATENT DOCUMENTS

| | | |
|---|---|---|
| 2003/0109973 A1 | 6/2003 | Hensey et al. |
| 2003/0120745 A1 | 6/2003 | Katagishi et al. |
| 2003/0182033 A1 | 9/2003 | Underdahl |
| 2004/0009819 A1 | 1/2004 | Koga |
| 2004/0054470 A1 | 3/2004 | Farine et al. |
| 2004/0236596 A1 | 11/2004 | Chowdhary et al. |
| 2004/0243368 A1 | 12/2004 | Hierner et al. |
| 2005/0107946 A1 | 5/2005 | Shimizu |
| 2005/0209775 A1 | 9/2005 | Entenmann |
| 2005/0273250 A1 | 12/2005 | Hamilton et al. |
| 2007/0001831 A1 | 1/2007 | Raz et al. |
| 2007/0050108 A1* | 3/2007 | Larschan ............... G07C 5/085 |
| | | 701/33.4 |
| 2007/0083314 A1 | 4/2007 | Corigliano |
| 2007/0156337 A1 | 7/2007 | Yanni |
| 2007/0179709 A1 | 8/2007 | Doyle |
| 2008/0154489 A1 | 6/2008 | Kaneda et al. |
| 2008/0154712 A1 | 6/2008 | Wellman |
| 2008/0243389 A1 | 10/2008 | Inoue |
| 2008/0262646 A1 | 10/2008 | Breed |
| 2008/0319602 A1 | 12/2008 | McClellan et al. |
| 2009/0143923 A1 | 6/2009 | Breed |
| 2009/0156310 A1 | 6/2009 | Fargo |
| 2009/0167699 A1* | 7/2009 | Rosenblatt ............. G06F 3/044 |
| | | 345/173 |
| 2009/0186325 A1 | 7/2009 | Kumar |
| 2009/0187300 A1* | 7/2009 | Everitt ............... G01C 21/3602 |
| | | 701/31.4 |
| 2009/0267921 A1* | 10/2009 | Pryor .................... B60K 35/00 |
| | | 345/177 |
| 2010/0160013 A1 | 6/2010 | Sanders |
| 2010/0209884 A1 | 8/2010 | Lin et al. |
| 2010/0209890 A1 | 8/2010 | Huang et al. |
| 2010/0209891 A1 | 8/2010 | Lin et al. |
| 2010/0211278 A1 | 8/2010 | Craig |
| 2011/0112739 A1 | 5/2011 | O'Dea |
| 2011/0148618 A1 | 6/2011 | Harumoto et al. |
| 2011/0161116 A1 | 6/2011 | Peak et al. |
| 2012/0256770 A1 | 10/2012 | Mitchell |
| 2013/0006675 A1* | 1/2013 | Bowne ............... G06Q 10/0639 |
| | | 705/4 |
| 2013/0046559 A1 | 2/2013 | Coleman et al. |
| 2013/0082933 A1* | 4/2013 | Liang .................... G06F 1/1662 |
| | | 345/169 |
| 2013/0141250 A1* | 6/2013 | Mathieu ................ B60K 35/00 |
| | | 340/901 |
| 2013/0164712 A1 | 6/2013 | Hunt et al. |
| 2013/0164713 A1 | 6/2013 | Hunt et al. |
| 2013/0164715 A1 | 6/2013 | Hunt et al. |
| 2013/0166170 A1 | 6/2013 | Hunt et al. |
| 2013/0169900 A1* | 7/2013 | Dighde .................... G02B 1/11 |
| | | 349/43 |
| 2013/0184965 A1 | 7/2013 | Hunt et al. |
| 2013/0209968 A1 | 8/2013 | Miller |
| 2013/0214986 A1* | 8/2013 | Zhu ........................ H01Q 1/243 |
| | | 343/848 |
| 2013/0274955 A1 | 10/2013 | Rosenbaum |
| 2013/0293425 A1* | 11/2013 | Zhu ........................ H01Q 1/243 |
| | | 343/702 |
| 2013/0345927 A1 | 12/2013 | Cook et al. |
| 2014/0009344 A1* | 1/2014 | Zhu ..................... H01Q 1/2266 |
| | | 343/702 |
| 2014/0257943 A1 | 9/2014 | Nerayoff et al. |
| 2014/0309849 A1* | 10/2014 | Ricci ........................ B60Q 1/00 |
| | | 701/33.4 |
| 2014/0350777 A1 | 11/2014 | Kawai et al. |
| 2014/0365070 A1 | 12/2014 | Yano et al. |
| 2015/0291176 A1 | 10/2015 | Jeong |
| 2017/0313332 A1* | 11/2017 | Paget ................. B61L 27/0077 |

FOREIGN PATENT DOCUMENTS

| | | |
|---|---|---|
| CA | 2388572 T1 | 5/2001 |
| EP | 2116968 A1 | 11/2009 |
| JP | 280985 A | 10/2001 |
| WO | 023550 | 3/2003 |

OTHER PUBLICATIONS

Tiscor: Inspection Manager 6.0 User Guide. USA; 2004.1-73.

"D. 0. T. Driver Vehicle Inspection Reports on your wireless phone!" FleeTTrakkeR LLC 2002-2003 FleeTTrakkeR LLC . All rights reserved <http://www.fleettrakker.com/web/index.jsp>.

"Detex Announces the Latest Innovation in Guard Tour Verification Technology." DETEX Life Safety, Security and Security and Security Assurance. Jan. 1, 2003. 1 pp. © 2002-2004 Detex Corporation. <http://www.detex.com/NewsAction.jspa?id=3>.

"Nextel, Motorola and Symbol Technologies Offer First Wireless Bar Code Scanner for Mobile Phones" InvoiceDealers.

"The Data Acquisition Unit Escorte." The Proxi Escort.com. Nov. 20, 2001. 4pp. © 2000 GCS General Control Systems. >http://www.gcs.at/eng/produkte/hw/escorte.htm>.

"Tracking out of route: software helps fleets compare planned routes to actual miles. (Technology)." Commercial Carrier Journal. Published Oct. 1, 2005. 4pp. NDN-219-1054-1717-0.

"What is the Child Check-Mate Safety System?" 2002@Child Checkmate Systems, Inc. <http://www.childcheckmate.comlwhat.html>.

Albright, Brian: "Indiana Embarks on Ambitious RFID roll out." Frontline Solutions. May 20, 2002; 2pp. Available at: <http://www.frontlinetoday.comlfrontline/article/articleDetail.jsp?id=19358>.

Anonymous. "Transit agency builds GIS to plan bus routes." American City & County. vol. 118, No. 4. Published Apr. 1, 2003. 4pp. NDN-258-0053-0664-6.

Contact: GCS (UK), Tewkesbury Gloucestershire. Dec. 11, 2002. 2pp. Copyright © 2000 GCS General Control Systems <http://www.gcs.at?eng/newsallegemein.htm>.

Dwyer, B.A., et al. Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.

Kurtz, Jennifer. "Indiana's E-Govemment: A Story Behind It's Ranking." INCONTEXT Indiana;s Workforce and Economy. Jan.-Feb. 2003 vol. 4, No. 5pp. Available at: <http://www.incontext.indiana.edu/2003/janfeb03/governement.html>.

Quaan et al., "Guard Tour Systems." Security Management Online Sep. 16, 2003. 1pg. © 2000 Available at: <http://www.securitymanagement.comiubb/Forum30/HTMLI000066.html>.

Qualcomm. "Object FX Integrates TrackingAdvisor with Qualcomm's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

Senger, Nancy. "Inside RF/ID: Carving a Niche Beyond Asset Tracking." Business Solutions. Feb. 1999; 5pp. Available at: <http://www.businesssolutionsmag.comiArticles/1999_02/990208.html>.

Tiscor: The Mobile Software Solutions Provider. Inspection Manager: An Introduction and Slide Presentation; 19pp. Available: <www/TOSCOR.com>.

Tsakiri, M et al. Abstract: "Urban fleet monitoring with GPS and GLONASS." Journal ofNavigation, vol. 51, No. 3. Published Sep. 1998. 2pp. NDN-174-0609-4097-3.

Tuttle, John R. "Digital RF/ID Enhances GPS" Proceedings of the Second Annual Wireless Symspoium, pp. 406-411, Feb. 15-18, 1994, Santa Clara, CA.

Want, Roy, "RFID a Key to Automating Everything." Scientific American (Jan. 2004): 58-65.

* cited by examiner

MOBILE COMPUTING DEVICE FOR FLEET TELEMATICS

RELATED APPLICATIONS

This application is based on four prior provisional applications; Ser. No. 61/709,966, filed on Oct. 4, 2012, Ser. No. 61/710,720, filed on Oct. 7, 2012, Ser. No. 61/710,721, filed on Oct. 7, 2012, and Ser. No. 61/711,197, filed on Oct. 8, 2012, the benefits of the filing dates of which are hereby claimed under 35 U.S.C. § 119(e).

BACKGROUND

Operators of fleet vehicles, including trucking and bus companies, are faced with an increasingly onerous set of regulations, which in part require the regular completion of forms and reports by operators (drivers) of such fleet vehicles. For example, the Hours of Service regulations require that certain commercial drivers limit their driving time per day, and also cumulatively over either a seven or eight day period, in order to avoid driver fatigue, which can lead to increased accidents. In order to meet this regulation it is necessary for drivers to record their driving time, and to be ready to display their most recent day and week of activity, if requested to do so by a public safety officer. Daily vehicle inspection reports also represent another type of data entry required of fleet drivers. The fleet owner must maintain these records in their back office for different periods of time, based on the information (inspection records have different retention periods than driver's logs).

It would be desirable to provide fleet operators with tools to address issues related to their vehicles and drivers.

SUMMARY

The concepts disclosed herein are directed to multiple embodiments of a mobile computing device optimized for operators of fleet vehicles. Certain novel aspects of the mobile computing devices disclosed herein are related to specific hardware and software combinations, as well as unique software applications whose functionality is of particular use to operators of fleet vehicles. It should be understood that any feature of one embodiment disclosed herein can be combined with one or more features of any other embodiment that is disclosed, unless otherwise indicated. The contents of the following copending provisional applications are hereby specifically incorporated by reference: Ser. No. 61/709,966, filed on Oct. 4, 2012, Ser. No. 61/710,720, filed on Oct. 7, 2012, Ser. No. 61/710,721, filed on Oct. 7, 2012, and Ser. No. 61/711,197, filed on Oct. 8, 2012.

It should be recognized that in exemplary embodiments, the mobile computing device is implemented using a tablet (or tablet computer) having a touch screen interface. In exemplary but not limiting embodiments the touch screen interface is a resistive, rather than capacitance based touch screen, to facilitate the use of a stylus type input device, and to enable operators to use fingers while wearing gloves, as might be encountered in an industrial environment.

In certain of the embodiments disclosed below a fleet telematics application being executed by the mobile computing device requires data from a position sensing component, such as a GPS unit (noting that other position sensing technologies, including but not limiting to GNSS, GLONASS, Galileo, IRNSS, and Beidou-2 can be similarly employed, depending on the location of the fleet vehicle whose position is to be determined). In some embodiments the GPS component can be part of the mobile computing device itself, while in other embodiments the mobile computing device is logically coupled to a separate and distinct GPS component. An exemplary separate GPS component is disclosed in detail below.

In certain of the embodiments disclosed below a fleet telematics application being executed by the mobile computing device requires a wireless data link to a remote computing device. In some embodiments the wireless data link is a Wi-Fi component that is part of the mobile computing device itself, while in other embodiments the mobile computing device is logically coupled to a separate and distinct Wi-Fi component. Data that can be conveyed via Wi-Fi include driver's logs, vehicle inspections reports, photos of damaged loads or equipment, IFTA data, vehicle diagnostic data, message data, and/or GPS data. In general, the data sent from the vehicle will be conveyed to the fleet operators back office (i.e., the fleet operator's computer system), or to a server system operated by a vendor for storing fleet data on behalf of the fleet operator.

In other of the embodiments disclosed below a fleet telematics application being executed by the mobile computing device requires a longer range wireless data link than Wi-Fi. In some embodiments the longer range wireless data link is a cellular modem component that is part of the mobile computing device itself, while in other embodiments the mobile computing device is logically coupled to a separate and distinct cellular modem component. In certain exemplary but not limiting embodiments the cellular modem component is a GSM modem that is part of a GPS unit to which the mobile computing device is logically coupled. Data that can be conveyed via long range wireless (such as GSM) include driver's logs, vehicle inspections reports, photos of damaged loads or equipment, IFTA data, vehicle diagnostic data, message data, and/or GPS data. In general, the data sent from the vehicle will be conveyed to the fleet operators back office (i.e., the fleet operator's computer system). The timing of the transfer of the data can be varied. In many cases, the fleet operator will wish to receive regular positional updates from the vehicle, and current driver log data and previously transmitted vehicle inspection data can be transmitted along with GPS data. The timing of such data transmissions can be varied to address fleet needs. Some fleets will want more frequent updates (requiring more data thus more cost), while other fleets will want relatively less data (or data relatively less often) at a lower cost. In some embodiments, the mobile computing device is configured to save relatively larger files, like pictures, for transmission only when Wi-Fi is available.

In certain of the embodiments disclosed below a fleet telematics application being executed by the mobile computing device requires data from a vehicle ECU or a vehicle data bus. In some embodiments the mobile compute device is logically coupled to the vehicle data bus (or a vehicle ECU) via a direct connection. In other embodiments the mobile computing device is coupled to a telematics device such as a GPS unit, which itself is logically coupled to the vehicle data bus. In certain embodiments the mobile computing device includes a GPS component and a long range wireless data link components (such as a GSM modem, such a long range data link being exemplary and not limiting), and the mobile computing device is coupled to a vehicle ECU or vehicle data bus via a cable or dongle. In certain embodiments the dongle is hardwired to the mobile computing device (or a docking station into the mobile computing device is docked). In other embodiments the dongle that is logically coupled to the vehicle ECU or data base includes a Wi-Fi component, and Wi-Fi is used to transfer data between the dongle and the mobile computing device.

In at least some embodiments the mobile computing device is used with a docking station that is mounted in the vehicle. In an exemplary embodiment the docking station is coupled to a power source, such that when docked a battery in the mobile computing device is charged. In a preferred embodiment either the dock or mobile computing device includes overcharge protection to increase battery life. In another exemplary embodiment, the docking station is logically coupled to one or more of a telematics unit (such as a GPS unit) and a vehicle data bus (and/or vehicle ECU).

A plurality of specific mobile computing device embodiments are briefly disclosed below. In general, the summary below defines the concepts disclosed herein in terms of a mobile computing device having a specific hardware configuration, and/or implementing a specific function (i.e., executing a specific application, such as an inspection application). Those of ordinary skill in the computer arts will recognize that specific application functions can be implemented via custom logical circuits, as well as by a general purpose computing device executing very specific sets of machine instructions, that when executed by a processor implement the specifically defined function. Where the novel concept is a specific function being implemented, it should be recognized that the concepts summarized can also be implemented as non-transitory memory media onto which novel sets of machine instructions configured to implement the specific function are stored, as well as a series of method steps to implement the specific function.

A mobile computing device for fleet telematics including a display and a controller configured to present an inspection application to a user, the device including a radiofrequency (RF) detecting coil that extends substantially along a first perimeter edge of the device. In a related embodiment, a portion of the RF coil extends along a portion of a second perimeter edge, where the first and second perimeter edges are orthogonal to each other. In yet another related embodiment, a portion of the RF coil extends along a portion of a third perimeter edge, where the second and third perimeter edges are parallel to each other.

A related embodiment is directed to a mobile computing device for fleet telematics including a display and a controller configured to present an inspection application to a user, the device including a first RF coil that extends substantially along a first perimeter edge of the device, and a second RF coil that extends substantially along a second perimeter edge of the device. In at least one related embodiment, the first perimeter edge and the second perimeter edge are parallel to one another. In a different but related embodiment, the first perimeter edge and the second perimeter edge are orthogonal to one another. The embodiments noted in this and the preceding paragraph can be modified so the RF coil extends along only a portion of its respective perimeter edge.

A mobile computing device with an inspection application and an indicator light proximate an inspection sensor, with the device programmed such that the indicator light is only enabled when the inspection application is running. In a related embodiment the same indicator light is used to indicate the device is recharging. The indicator light can emit a first color during recharging and a second color when the inspection application is running. In an exemplary embodiment green indicates recharging and blue is for inspection mode.

A mobile computing device with an inspection application and a flashlight, with the device programmed such that the flashlight is only enabled when the inspection application is running.

A mobile computing device with an inspection application and a digital camera, with the device programmed such that the digital camera is only enabled when the inspection application is running. In a related embodiment, the camera can be enabled when a document scanning application using the camera is activated. In another related embodiment, the camera can be enabled when a damaged freight application using the camera is activated. In still another related embodiment, the camera can be enabled when an accident documentation application using the camera is activated.

A mobile computing device for fleet telematics including a display, an RFID reader, and a controller configured to prompt a user to scan their unique RFID token issued to the driver by the fleet operator to unlock the mobile computer device to allow the driver to access any applications stored on the mobile computing device. In an exemplary embodiment a user cannot access a driver log application without being prompted to scan their RFID token. In an exemplary embodiment a user cannot access an inspection application without being prompted to scan their RFID token. In an exemplary embodiment a user cannot access any applications without being prompted to scan their RFID token.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Figure 2:
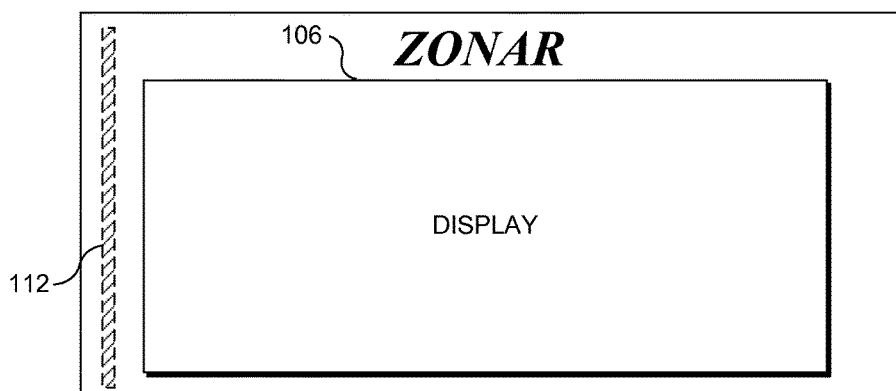
Figure 3:
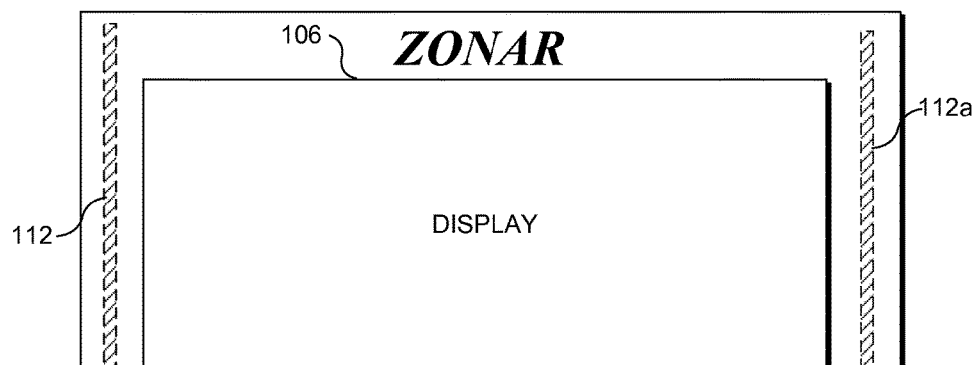
Figure 4:
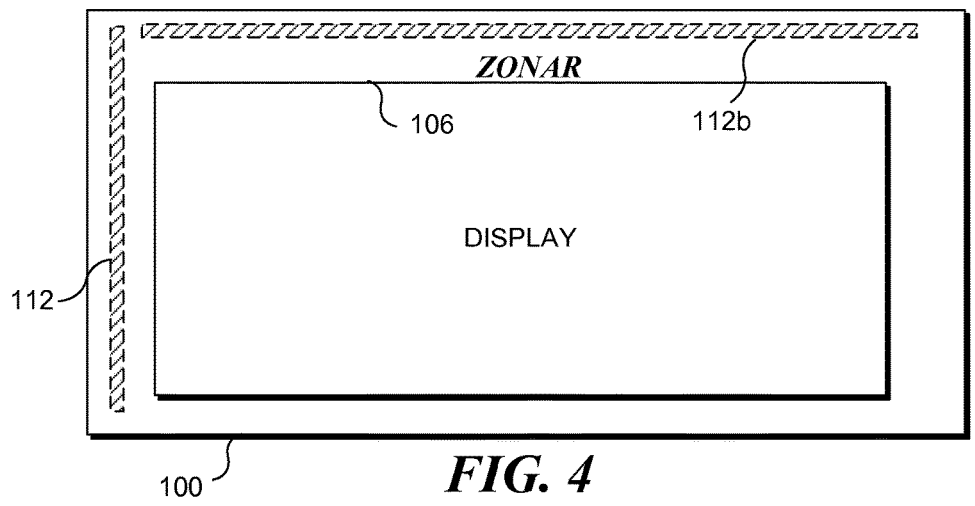
Figure 5:
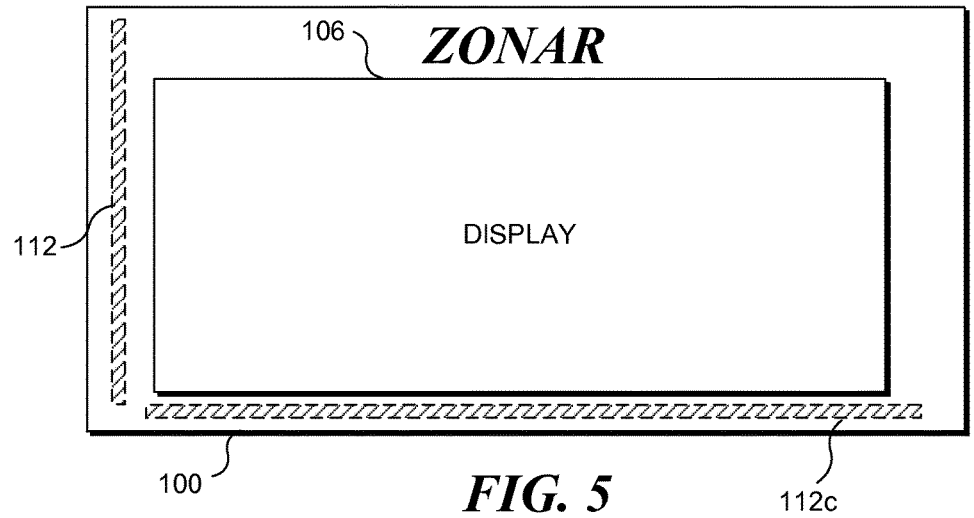
Figure 6:
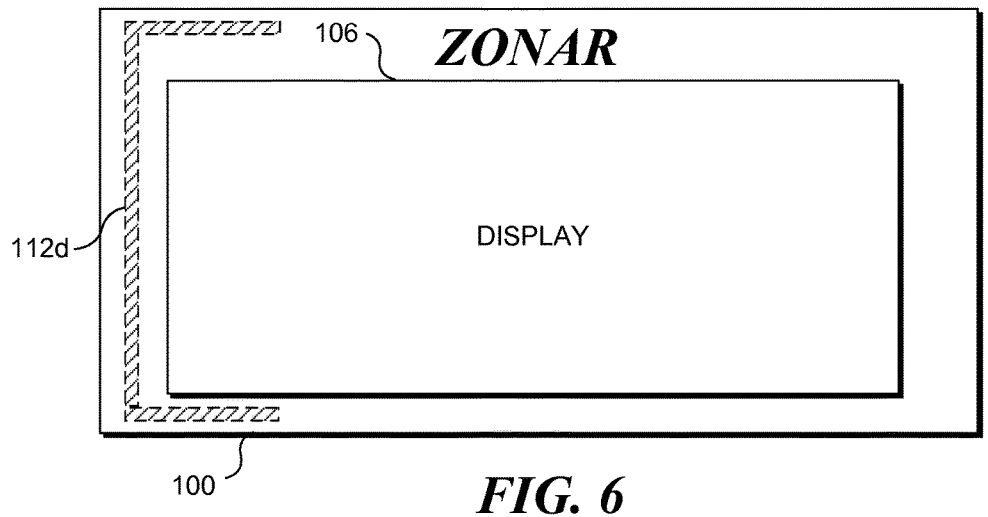
Figure 7:
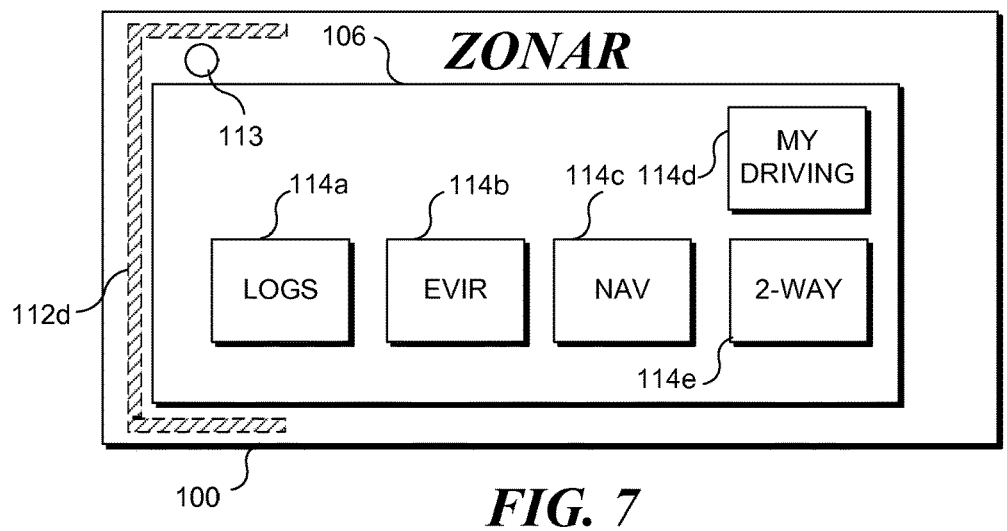
Figure 8:
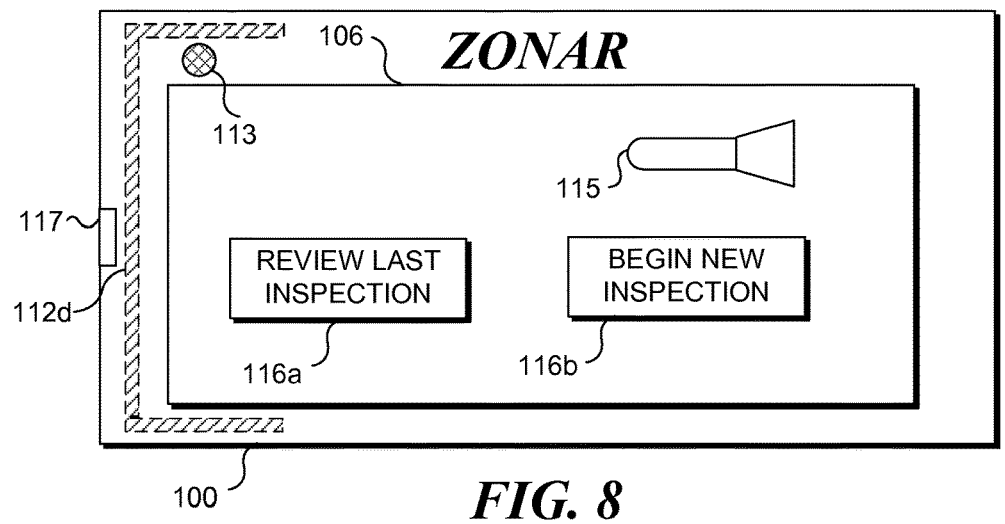
Figure 10:
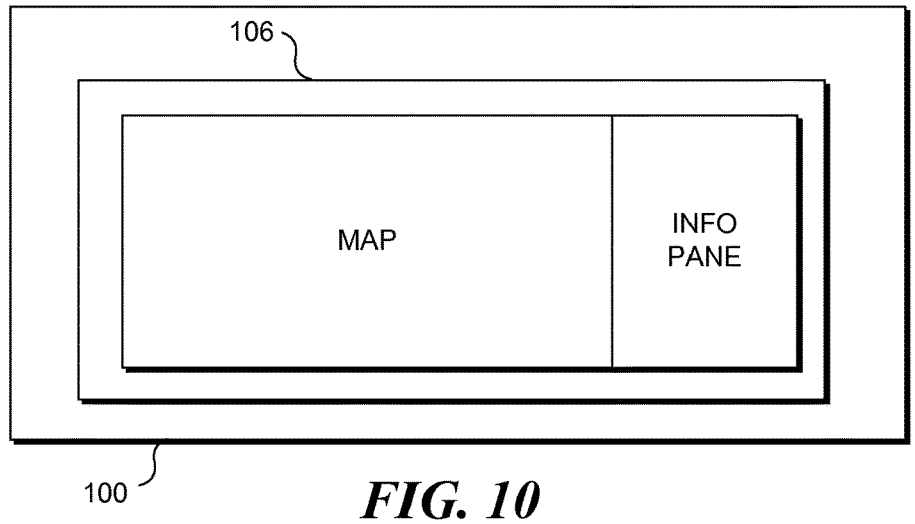
Figure 9:
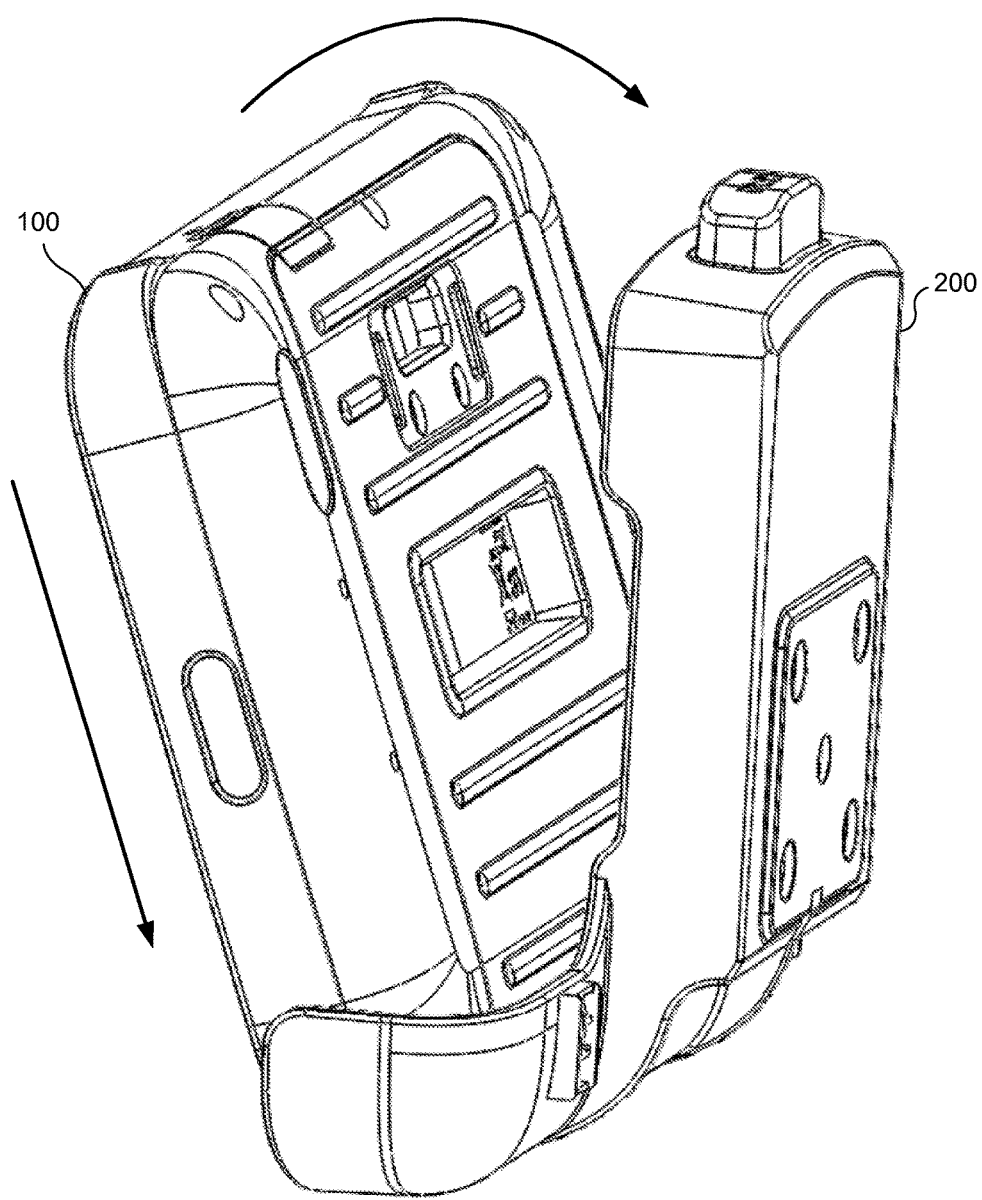
Figure 11:
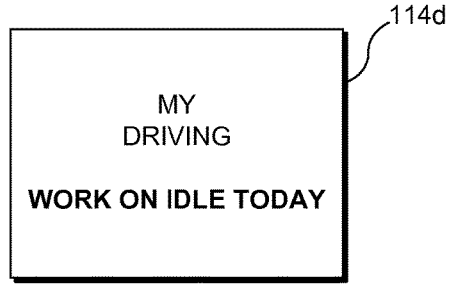
Figure 12:
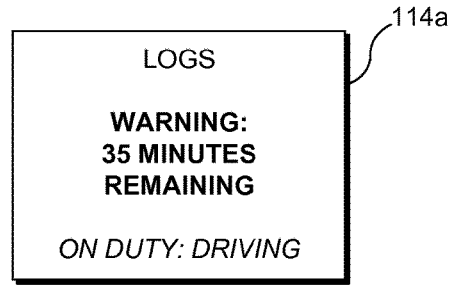
Figure 13:
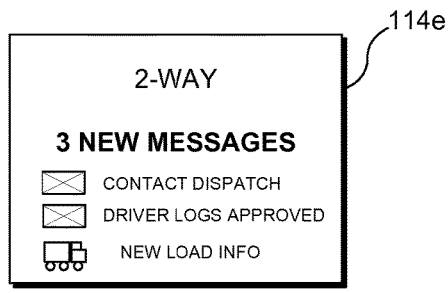
Figure 14:
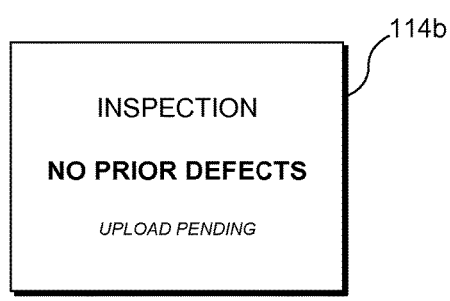
Figure 15:
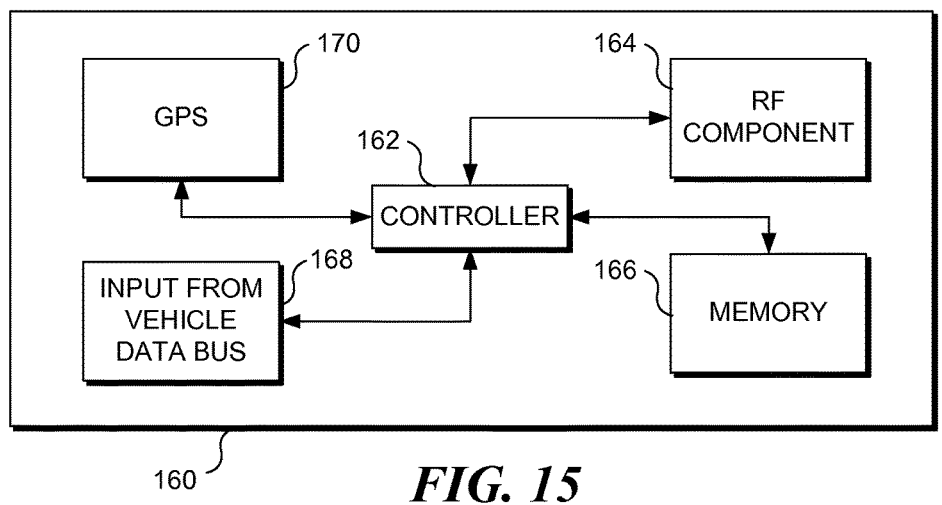
Figure 16:
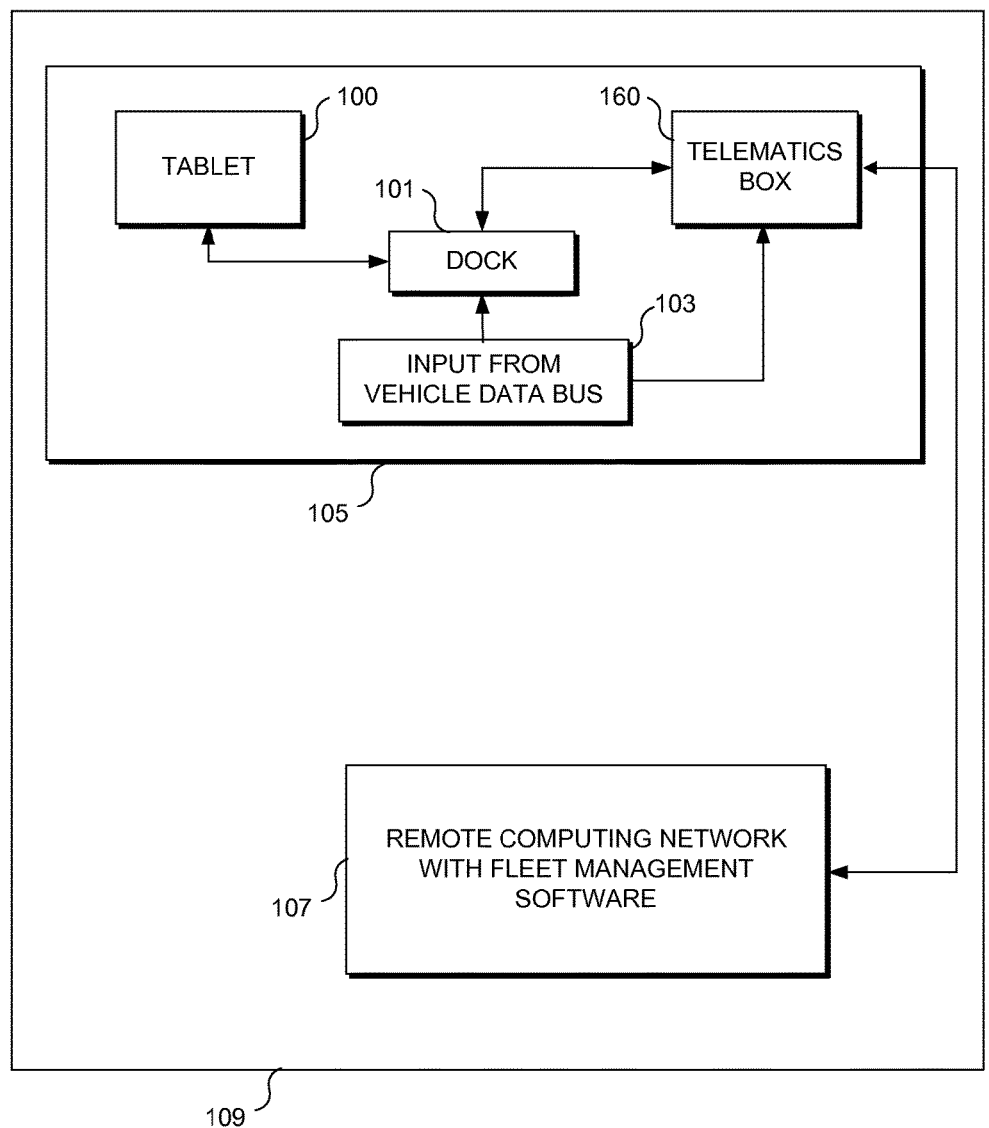

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is a functional block diagram of an exemplary mobile computing device for implementing one or more of the concepts disclosed herein;

FIG. 2 schematically illustrates the device of FIG. 1 implemented as a tablet computing device with a touch screen display and an RFID reader having a first configuration;

FIG. 3 schematically illustrates the device of FIG. 1 implemented as a tablet computing device with an RFID reader having a second configuration;

FIG. 4 schematically illustrates the device of FIG. 1 implemented as a tablet computing device with an RFID reader having a third configuration;

FIG. 5 schematically illustrates the device of FIG. 1 implemented as a tablet computing device with an RFID reader having a fourth configuration;

FIG. 6 schematically illustrates the device of FIG. 1 implemented as a tablet computing device with an RFID reader having a fifth configuration;

FIG. 7 schematically illustrates the device of FIG. 1 implemented as a tablet computing device with a plurality of telematics applications that can be selected by a user;

FIG. 8 schematically illustrates the tablet of FIG. 7 after a user has selected an inspection application;

FIG. 9 schematically illustrates the tablet of FIGS. 2-8 being inserted into a dock in the vehicle;

FIG. 10 schematically illustrates the tablet of FIG. 7 after a user has selected a navigation application;

FIG. 11 schematically illustrates an enlarged view of the driver performance application tile of the tablet of FIG. 7;

FIG. 12 schematically illustrates an enlarged view of the driver log application tile of the tablet of FIG. 7;

FIG. 13 schematically illustrates an enlarged view of the 2-way message application tile of the tablet of FIG. 7;

FIG. 14 schematically illustrates an enlarged view of the inspection application tile of the tablet of FIG. 7;

FIG. 15 is a functional block diagram of an exemplary telematics device added to an enrolled vehicle to be used in connection with one or more of the mobile computing devices discussed above, where the telematics device enables the table to be coupled to a vehicle data bus via the telematics device, enables the tablet to access a wireless data link integrated into the telematics device, and enables the tablet to access a position sensing component integrated into the telematics device; and FIG. 16 is a functional block diagram of an exemplary system including the telematics tablet of FIG. 2 and the telematics device of FIG. 15 installed in a vehicle, which is wirelessly coupled to a remote computer network implementing a fleet management software application.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated. When the term substantially is employed in the claims or specification, it should be understood that the term encompasses an acceptable variance of plus or minus 25% in a specific parameter. Thus, extends substantially along an edge is to be interpreted as extends along at least 75% of said edge.

High Level Summary of an Exemplary Mobile Computing Device

In general, the concepts disclosed herein are implemented using a mobile computing device. While a commercial implementation simultaneously includes many of the concepts disclosed herein, it should be understood that many of the concepts disclosed herein can be implemented independently of one another, thus a description of an exemplary device including multiple implementations of the concepts disclosed herein should not be considered to be a teaching that the concepts disclosed herein cannot be implemented individually, unless some embodiment explicitly teaches that multiple concepts are implemented in the same device.

In at least some embodiments of the concepts disclosed herein, certain functionalities require that the mobile computing device (such as a tablet) be docked into a receiving station (or dock) in the vehicle, for the vehicle to be driven, or for a particular application to be functional. In at least one embodiment, a driver log functionality requires the mobile computing device be docked, and that the dock be logically coupled to a vehicle data bus. In a related embodiment, a driver log functionality requires the mobile computing device include or be logically coupled to a position sensing component such as a GPS. In yet another related embodiment, a driver rating or performance application will not be functional unless the mobile computing device be logically coupled to one or more of a vehicle data bus and/or apposition sensing component.

In other embodiments, the vehicle cannot be started unless the mobile computing device is docked. In other embodiments, the vehicle can be started or driven with the mobile computing device/tablet undocked, but the driver log functionality or driver monitoring applications will not work.

In some embodiments, data from the mobile computing device needs to be conveyed to a remote computing device (either operated by the fleet or a third party vendor offering data hosting services). The mobile computing device can include a wireless data link, such as Wi-Fi, to transfer data when a local connection is available link (which may include a land line component). The mobile computing device can include a satellite or cellular modem. In other embodiments, the mobile computing device can be logically coupled to a device present in the vehicle which includes a wireless data link, such as a cell phone or cellular modem. In an exemplary, but not limiting embodiment, the mobile computing device is logically coupled to an onboard telematics device including a GPS component and a cellular modem. It should be recognized that the path taken by data between the communications device and the base station/remote server can vary. In some embodiments, data moves from communications device to a cell phone provider's servers, and then via the Internet (perhaps via a land line data link, as opposed to a wireless data link) to a telematics service provider who hosts the data at their server. The fleet's back office or computer system can then access the hosted data via a web portal.

In at least one embodiment, the concepts disclosed herein may be embodied by a ruggedized tablet computer, equipped with a sensor (such as an optical scanner or RFID reader) able to determine when a driver is proximate a specific inspection location or zone, specific machine instruction sets defining specific applications of value to fleet operators, at least one data port through which data can be exported (this can be one or more of a USB port, a serial port, a parallel port, or a wireless data link including Wi-Fi and/or a cell modem), and optional equipment such as a digital camera, speakers, and flashlight. As shown in Table 1, the applications installed on an exemplary tablet are designed to provide one or more of the following five separate functions: 1) to facilitate a driver in adhering to the Hours of Service legal mandate for commercial drivers; 2) to facilitate vehicle inspections using an Electronic Vehicle Inspection Report (EVIR), which prompts and facilitate visual inspection of the vehicle tasked to the driver and records of the results of this inspection, including verifying that the driver was physically present at specifically defined zones; 3) to monitor and under some conditions record driver behavior (such as idle, speed, hard cornering, hard braking, cruise control use, noting that such metrics are exemplary and not limiting), and to use such data to provide driver performance coaching based on the analysis of the data collected; 4) to receive electronic messages and make them available to the driver, and enable the driver to send such messages; and 5) to display maps to aid navigation (including routes to specific designations).

In at least one exemplary embodiment the communications device is a telematics unit logically coupled to a vehicle data bus and/or ECU, the telematics unit including a GPS component, a wireless data link such as a cellular data modem, and a processor configured to determine what data should be sent from the vehicle to a remote server, and how frequently that data is to be sent) is not actually integrated into the tablet. Note that in such an embodiment the communications device minimally performs the function of establishing a wireless data link between a vehicle and a remote server (operated by the fleet owner or a monitoring service) and logically coupling the tablet to the vehicle data bus/vehicle ECU. In at least some embodiments the communications device also includes a GPS component which tracks vehicle location during vehicle operation, and control logic that is used to selectively collect information from the vehicle and transmit that information to the remote server. Today's vehicles include multiple processors and there is a tremendous amount of data generated during vehicle operation. In at least some embodiments the controller in the communications device includes firmware (i.e., software or machine instructions) that is used to determine what vehicle data should be sent from the vehicle to the remote server. Useful data can include diagnostic data (which may be used to remotely evaluate the health or status of the vehicle), mileage data, odometer data, fuel use data, fault code data, transmission data, brake data, and RPM data. The tablet will be generating data that also should be conveyed to the remote server (operated by the fleet owner or a monitoring service, noticing that some types of data can be sent to the fleet operator and some types of data can be sent to the monitoring service, as well as other permutations and combinations of data destinations). One type of data that can be sent from the tablet to a remote server is driver log data. Another type of data that can be sent from the tablet to a remote server is vehicle inspection data. Still another type of data that can be sent from the tablet to a remote server is message data.

Note that for the tablet to execute a driver log application that is compliant with AOBR rules, the tablet must be logically coupled to the vehicle data bus or a vehicle ECU. Modifications to the driver log application can be made when EOBR rules are finalized, to make the driver log application EOBR compliant. The logical connection is used to extract identification data from the vehicle, and to extract data about the vehicle status (on/off, or moving not moving), and such data can be added to the driver log data to link the driver log to actual vehicle data (making falsification of driver logs more difficult). That logical connection can be via the communications device. It should also be understood that the logical connection could be achieved in some other fashion, including via a docking station the tablet is inserted into, via a hard wired data link, or a wireless data link if the vehicle data bus/vehicle ECU is equipped to be accessed via a wireless data link.

It should be recognized that if the tablet is logically coupled to the vehicle data bus or vehicle ECU in some fashion other than thru the communications device, that the wireless data link of the communications device can be integrated into the tablet. Where the communications device includes a GPS component, the GPS component can also be integrated into the tablet. Where the communications device includes a controller executing firmware (i.e., software or machine instructions) that is used to determine what vehicle data should be sent from the vehicle to the remote server, the controller in the tablet can be programmed to implement such functions. Thus it should be understood that in some embodiments, the communications device is not required because all the functions implemented by the communications device can be implemented in the tablet, if the tablet is equipped with the appropriate logic, wireless data link, GPS component, and the tablet is logically coupled to the vehicle data bus or vehicle ECU.

TABLE 1

Tablet Functions

| Function | Standard Features | Unique Features |
| --- | --- | --- |
| Hours of Service - Facilitate driver in fulfilling the On-duty Service legal mandate | Electronic entry of Hours of Service. Notification if within one hour of violating regulations. Notification if in violation. | Fix errors by sending correction to base station computer, base station enters corrections and sends to driver for verification. Tablet 10 senses motion and prompts user to indicate whether driving is for personal conveyance or on-duty time |
| Visual Inspection - Facilitate visual inspection of the vehicle tasked to the driver; recording and transmitting the results of this inspection | User must make RF contact with RFID chips posted on truck exterior. User is prompted to enter information regarding visual inspection. | Tablet 10 constructed with RF antenna along at least one entire side of the tablet. Tablet 10 flexible in that it can be used in the visual inspection of multiple types of vehicles using preinstalled inspection configurations. |
| Driving Analysis and Coaching - Monitor and record driving (vehicle position and movement over time), report the record of this driving to a further device, receive and display driving coaching advice based on analysis of driving | Detects and keeps record of hard braking, idle time events, Max Speed events, and hard cornering. | A geographical area may be excluded from data collection. One motivation for doing this would be if infraction were caused not by driver carelessness but by the peculiarities of the roadway. Driver prompted to enter explanatory driving incidents (hard braking to avoid hitting commuter) at end of trip (trip = key on/key off, also referred to herein as driving session). |
| Messaging - Receive electronic messages and make them available to the driver | Display message notifications on tablet | Message voice reader can be set to automatically voice read all messages. |
| Navigation - Display maps to aid navigation | Show maps, vehicle position on map. | Side panel permits display of other items of interest, such as incoming messages. |

Exemplary Tablet Computing Device

FIG. 1 is a functional block diagram of an exemplary mobile computing device 100 for fleet telematics including a display 106 and a controller 102 configured to present at least one telematics application to a user. A non-transitory physical memory 104 is included, upon which machine instructions define one or more applications are stored. Device 100 includes an RFID reader 108 (or other sensor) that enables an inspection application to verify that the device is proximate an inspection location (an optical scanner could also be employed, as well as other sensors). In exemplary but not limiting embodiments, the device includes at least one data input 110 that can be used to logically couple the device to a vehicle data bus (in certain disclosed embodiments, applications implemented on the tablet required input from the vehicle databus or a vehicle controller/computer).

Device 100 may include additional components, including but not limiting to a GSM component, a Wi-Fi component, a USB component, a rechargeable battery, and in at least one embodiment a GPS component.

FIG. 2 schematically illustrates device 100 implemented as a tablet computing device with display 106 implemented as a touch screen. In such an embodiment device 100 is enclosed in a ruggedized housing suitable for industrial environments. In an exemplary but not limiting embodiment the touch screen display is a resistive verses capacitance based display, so that a user can actuate the touch screen using a stylus or fingers while wearing gloves. Note that a coil 112 for RFID reader 108 (see FIG. 1) extends substantially along an entire a perimeter of the device (i.e., along at least 51% of the perimeter). The use of a relatively larger coil means that the device need not be so precisely positioned to read relatively short range RFID tags.

FIG. 3 schematically illustrates device 100 similarly implemented as a tablet computing device, where an additional RF coil 112a for RFID reader 108 extends substantially along an entire second perimeter of the device. Note coil 112 and 112a are disposed in a parallel configuration.

FIG. 4 schematically illustrates device 100 similarly implemented as a tablet computing device, where an additional RF coil 112b for RFID reader 108 extends substantially along an entire third, upper perimeter of the device. Note coil 112 and 112b are disposed in an orthogonal configuration.

FIG. 5 schematically illustrates device 100 similarly implemented as a tablet computing device, where an additional RF coil 112c for RFID reader 108 extends substantially along an entire fourth, lower perimeter of the device. Note coil 112 and 112c are disposed in an orthogonal configuration.

FIG. 6 schematically illustrates device 100 similarly implemented as a tablet computing device, where RF coil 112d for RFID reader 108 extends substantially along the first perimeter of the device, and also along a portion of the upper and lower perimeters, those portions being adjacent to the first perimeter.

FIG. 7 schematically illustrates device 100 similarly implemented as a tablet computing device, and including RF coil 112d, which in the displayed embodiment exhibits a plurality of telematics applications that can be selected by a user, and an indicator light 113 disposed proximate a portion of RF coil 112d. The telematics applications include a driver log application 114a, an electronic verified inspection report (EVIR) application 114b, a navigation application 114c, a driver behavior monitoring driving application 114d, and a 2-way messaging application 114e. It should be understood that for the purposes of FIG. 7, applications other than EVIR are exemplary, and not limiting.

FIG. 8 schematically illustrates device 100 similarly implemented as a tablet computing device, and including RF coil 112d and indicator light 113, in which a user has selected the EVIR (inspection) application 114b, and the inspection application is running. While the inspection application is running, indicator light 113 is energized, so that the user has a reference point with which to use to aim the device at an RFID tag. The device is intended to be used with relatively short range RFID tags, so the user must properly orient the device relative to the RFID tag to enable the RFID tag to be read. A flashlight icon 115 is displayed to the user, and selecting the icon will energize a high intensity flashlight 117. Such a flashlight will aid in inspection items in poorly lit locations. Note that in at least one embodiment device 100 is configured such that the flashlight can only be energized when the inspection application is running. While not shown, it should be understood that device 100 can similarly include a camera, and such an embodiment can be configured such that the digital camera can only be energized or enabled when the inspection application is running Note the indicator light next to the sensor is in some embodiments also used to indicate the tablet is being recharged. Different colors can be used for different states. In on embodiment blue is for inspection mode and green for recharging.

FIG. 9 schematically illustrates device 100 (implemented as a tablet) being inserted into a dock 200. The dock includes a lower portion configured to supportingly receive a bottom edge of the tablet. A plurality of screw holes in the rear face of the dock enable the dock to be attached to a mounting bracket. Not shown are electrical ports enabling the dock to be electrically coupled to a power source for energizing or recharging the tablet, and to provide a data connection between the tablet and other components, such as a vehicle ECU and/or a telematics device including a GPS component and a cellular data link (or other wireless data link).

The tablet is inserted into the dock by placing a lower edge of the tablet into the lower portion of the dock. The rear face of the tablet initially does not yet engaged the front face of the dock. The tablet will need to be rotated to seat the tablet in the dock.

While device 100 is generally docked while the vehicle is in motion (so a data link between the vehicle data bus, and or a separate GPS component and/or wireless data link can be maintained), device 100 can be removed from the dock to perform an inspection, to use the camera to scan documents or take pictures of damaged freight or for accident documentation (or other functions, depending on the specific applications loaded onto the device). Where device 100 implements a driver log application the device can be removed from the dock when a law enforcement officer wants to review their electronic logs. The driver undocks the tablet and gives it to the officer, along with a cab card explaining the tablet and how to view HOS logs from the tablet. The officer may also extract log data via USB or other data port.

The following paragraphs discuss various different embodiments of an exemplary mobile computing device, such as device 100, encompassing one or more of the concepts disclosed herein.

It should be recognized that in exemplary embodiments, the mobile computing device is implemented using a tablet (or tablet computer) having a touch screen interface. In exemplary but not limiting embodiments the touch screen interface is a resistive, rather than capacitance based touch screen, to facilitate the use of a stylus type input device, and to enable operators to use fingers while wearing gloves, as might be encountered in an industrial environment.

In certain of the embodiments disclosed below a fleet telematics application being executed by the mobile computing device requires data from a GPS unit. In some embodiments the GPS component can be part of the mobile computing device itself, while in other embodiments the mobile computing device is logically coupled to a separate and distinct GPS component. An exemplary separate GPS component is disclosed in detail below.

In certain of the embodiments disclosed below a fleet telematics application being executed by the mobile computing device requires a wireless data link to a remote computing device. In some embodiments the wireless data link is a Wi-Fi component that is part of the mobile computing device itself, while in other embodiments the mobile computing device is logically coupled to a separate and distinct Wi-Fi component. Data that can be conveyed via Wi-Fi include driver's logs, vehicle inspections reports, photos of damaged loads or equipment, IFTA data, vehicle diagnostic data, message data, and/or GPS data. In general, the data sent from the vehicle will be conveyed to the fleet operators back office (i.e., the fleet operator's computer system).

In other of the embodiments disclosed below a fleet telematics application being executed by the mobile computing device requires a longer range wireless data link than Wi-Fi. In some embodiments the longer range wireless data link is a cellular modem component that is part of the mobile computing device itself, while in other embodiments the mobile computing device is logically coupled to a separate and distinct cellular modem component. In certain exemplary but not limiting embodiments the cellular modem component is a GSM modem that is part of a GPS unit to which the mobile computing device is logically coupled. Data that can be conveyed via long range wireless (such as GSM) include driver's logs, vehicle inspections reports, photos of damaged loads or equipment, IFTA data, vehicle diagnostic data, message data, and/or GPS data. In general, the data sent from the vehicle will be conveyed to the fleet operators back office (i.e., the fleet operator's computer system). The timing of the transfer of the data can be varied. In many cases, the fleet operator will wish to receive regular positional updates from the vehicle, and current driver log data and previously transmitted vehicle inspection data can be transmitted along with GPS data. The timing of such data transmissions can be varied to address fleet needs. Some fleets will want more frequent updates (requiring more data thus more cost), while other fleets will want relatively less data (or data relatively less often) at a lower cost. In some embodiments, the mobile computing device is configured to save relatively larger files, like pictures, for transmission only when Wi-Fi is available.

In certain of the embodiments disclosed below a fleet telematics application being executed by the mobile computing device requires data from a vehicle ECU or a vehicle data bus. In some embodiments the mobile compute device is logically coupled to the vehicle data bus (or a vehicle ECU) via a direct connection. In other embodiments the mobile computing device is coupled to a telematics device such as a GPS unit, which itself is logically coupled to the vehicle data bus. In certain embodiments the mobile computing device includes a GPS component and a long range wireless data link components (such as a GSM modem, such a long range data link being exemplary and not limiting), and the mobile computing device is coupled to a vehicle ECU or vehicle data bus via a cable or dongle. In certain embodiments the dongle is hardwired to the mobile computing device (or a docking station into the mobile computing device is docked). In other embodiments the dongle that is logically coupled to the vehicle ECU or data base includes a Wi-Fi component, and Wi-Fi is used to transfer data between the dongle and the mobile computing device.

In at least some embodiments the mobile computing device is used with a docking station that is mounted in the vehicle. In an exemplary embodiment the docking station is coupled to a power source, such that when docked a battery in the mobile computing device is charged. In a preferred embodiment either the dock or mobile computing device includes overcharge protection to increase battery life. In another exemplary embodiment, the docking station is logically coupled to one or more of a telematics unit (such as a GPS unit) and a vehicle data bus (and/or vehicle ECU).

A plurality of mobile computing device embodiments are briefly disclosed below. In general, the summary below defines the concepts disclosed herein in terms of a mobile computing device having a specific hardware configuration, and/or implementing a specific function (i.e., executing a specific application). Those of ordinary skill in the computer arts will recognize that specific application functions can be implemented via custom logical circuits, as well as by a general purpose computing device executing very specific sets of machine instructions, that when executed by a processor implement the specifically defined function. Where the novel concept is a specific function being implemented, it should be recognized that the concepts summarized can also be implemented as non-transitory memory media onto which novel sets of machine instructions configured to implement the specific function are stored, as well as a series of method steps to implement the specific function.

While some embodiments of mobile computing devices for fleet efficiency improvements disclosed herein include all the applications/functions listed in Table 1, other embodiments include fewer that all the applications defined in Table 1, or even just a single such application.

Exemplary Tablets Including an Inspection Application

There is a general requirement that a driver inspects his vehicle and fills out an inspection report for each trip. An earlier product, made available by the assignee of this application, permitted this report to be made in an electronic form using a hand held device (the EVIR 2010 handheld). To use this prior art device it is necessary to have RFID tags installed on the exterior of the vehicle, and the user must scan each one of these tags as he is filling out the report, to ensure that he is standing at the correct point to visually inspect the portion of the vehicle addressed by the portion of the report he is about to fill out. In embodiments including an inspection application, device 100 includes a mode in which the device 100 behaves essentially as the handheld EVIR 2010 device. To permit device 100 to fill this role it must be equipped with one or more RF antennas (coils). FIGS. 2-6, discussed above, schematically illustrate exemplary locations for such RF reading coils. The embodiments of FIGS. 2-6 provide the user enhanced flexibility in orientation of the device 100 while scanning an RFID tag as part of the vehicle inspection procedure.

The following paragraphs discuss various different embodiments of a mobile computing device, such as device 100, implementing an inspection application.

A mobile computing device for fleet telematics including a display and a controller configured to present an inspection application to a user, the device including a radiofrequency (RF) detecting coil that extends substantially along a first perimeter edge of the device. In a related embodiment, a portion of the RF coil extends along a portion of a second perimeter edge, where the first and second perimeter edges are orthogonal to each other. In yet another related embodiment, a portion of the RF coil extends along a portion of a third perimeter edge, where the second and third perimeter edges are parallel to each other.

A related embodiment is directed to a mobile computing device for fleet telematics including a display and a controller configured to present an inspection application to a user, the device including a first RF coil that extends substantially along a first perimeter edge of the device, and a second RF coil that extends substantially along a second perimeter edge of the device. In at least one related embodiment, the first perimeter edge and the second perimeter edge are parallel to one another. In a different but related embodiment, the first perimeter edge and the second perimeter edge are orthogonal to one another. The embodiments noted in this and the preceding paragraph can be modified so the RF coil extends along only a portion of its respective perimeter edge.

A mobile computing device with an inspection application and an indicator light proximate an inspection sensor, with the device programmed such that the indicator light is only enabled when the inspection application is running. In a related embodiment the same indicator light is used to indicate the device is recharging. The indicator light can emit a first color during recharging and a second color when the inspection application is running. In an exemplary embodiment green indicates recharging and blue is for inspection mode.

A mobile computing device with an inspection application and a flashlight, with the device programmed such that the flashlight is only enabled when the inspection application is running.

A mobile computing device with an inspection application and a digital camera, with the device programmed such that the digital camera is only enabled when the inspection application is running. In related embodiments where the device includes a document scanning application, the camera can also be enabled when the document scanning application is running. Similarly, where the device includes a damaged freight documentation application, the camera can also be enabled when that application is running Where the device includes a vehicular accident documentation application, the camera can also be enabled when that application is running.

Exemplary Tablets Including a Navigation Application

In general, a navigation application provides turn by turn directions, either visually, or audibly, or both. The maps are loaded into the tablet, and when the navigation application is running a 2D or 3D map is displayed on the screen, showing the driver the route. The route can be defined based on input from the driver or via an address contained in a message. A significant feature of the navigation application disclosed herein is that a portion of the screen is reserved for an information pane. Referring to FIG. 10, the navigation screen of device 100 displays a map and a margin area (the information pane) in which Hours of Service Warnings, Violation Notices, and Messages (including geo-fenced messages) may be displayed. The following paragraphs discuss various different embodiments of a mobile computing device, such as device 100, implementing a navigation application.

A mobile computing device for fleet telematics including a display and a controller configured to present a navigation application to a user, where when the navigation application is running, a portion of the display is dedicated to an information pane, and the information pane displays information about an aspect of the driver's performance based on recent driving data that should be improved during the current driving session. In one embodiment the driver performance improvement is related to reducing excessive idle. In one embodiment the driver performance improvement is related to reducing excessive hard braking events. In one embodiment the driver performance improvement is related to reducing excessive hard cornering events. In one embodiment the driver performance improvement is related to reducing excessive speeding events. In one embodiment the driver performance improvement is related to increasing use of cruise control. In one embodiment the driver performance improvement is related to reducing inefficient shifting patterns. In one embodiment the driver performance improvement is related to reducing use of accessories (such as fans and blowers that reduce MPG).

A mobile computing device for fleet telematics including a display and a controller configured to present a navigation application to a user, where when the navigation application is running, a portion of the display is dedicated to an information pane, and the driver's remaining hours of service are displayed in the information pane.

A mobile computing device for fleet telematics including a display and a controller configured to present a navigation application to a user, where when the navigation application is running, a portion of the display is dedicated to an information pane, and the driver's current MPG performance is displayed in the information pane.

A mobile computing device for fleet telematics including a display and a controller configured to present a navigation application to a user, where when the navigation application is running, a portion of the display is dedicated to an information pane, and the presence of an incoming message from a dispatcher is displayed in the information pane. In one embodiment, a driver can enter a single command in the mobile computing device to convert the text message to speech, so the driver can hear the message while keeping his eyes on the road.

A mobile computing device for fleet telematics including a display and a controller configured to present a navigation application to a user, where when the navigation application is running, a portion of the display is dedicated to an information pane, and a geofence triggered message is displayed in the information pane (when a location of the vehicle as tracked by a GPS unit included with the mobile computing device or to which the mobile computing device is logically coupled matches the geofence defined in the message).

In one embodiment, the geofence triggered message relates to providing the driver with specific load delivery or pickup information relating to the geofenced location. For example, distribution and warehouse facilities often have many different loading docks and entry gates, and the geofence triggered message can define for the driver the specific gate or loading dock the vehicle needs to navigate towards. Note that the specific required delivery gate of dock may not be known when the driver starts his trip. The geofence triggered message triggered message can be sent via a wireless data link to the mobile computing device after the driver has started the trip, and will be displayed to the driver as he approaches the location and needs that information. Another type of geofence triggered message related to speed limit data correlated to the current location. If such speed data indicates that the driver is going too fast, a slowdown message can be displayed in the information pane.

A mobile computing device for fleet telematics including a display and a controller configured to present a navigation application to a user, where when the navigation application is running, the controller is configured to include a popup in the navigation display when a driver is nearing the end of his allocated hours of service. In one embodiment, a popup is displayed over the navigation display when the driver has one hour left. In one embodiment, a popup is displayed over the navigation display when the driver has 30 minutes left. In one embodiment, a popup is displayed over the navigation display when the driver has fifteen minutes left. In one embodiment, a popup is displayed over the navigation display when the driver has no time left. It should be recognized that such time parameters are exemplary, and not intended to be limiting. In some embodiments, instead of popup, or in addition to a popup, an audible tone or message is used to convey that information to the driver.

Exemplary Tablets Including a Driver Log Application

The following paragraphs discuss various different embodiments of a mobile computing device, such as device 100, implementing a driver's log application.

A mobile computing device for fleet telematics including a display and a controller configured to present a driver log application to a user. In the driver log application, the home screen of driver log application includes a plurality of icons in navigation pane, each icon launching a specific function in the driver log application. In one embodiment a thumbs up icon is used to enable the user to confirm driver logs. In one embodiment a pen and paper icon is used to enable the user to verify driver logs. In one embodiment a gear icon is used to enable the user to perform a check to see if the device is coupled to the vehicle such that paper logs do not need to be employed. In one embodiment a truck icon is used to enable the user to input load information. In one embodiment a calendar icon is used to enable the user to change their duty status.

A mobile computing device for fleet telematics including a display and a controller configured to present an hours of service/driver log application to a user, where when the driver log application is running and the mobile computing device is coupled to a sensor that can detect vehicle motion, the controller is configured to include a popup in the driver log application display that prompts a driver to indicate if the driver is on duty or using the vehicle as a personal conveyance. In one embodiment the sensor is a GPS unit. In another embodiment the sensor is the vehicle data bus, such that information from the vehicle data bus is used to determine that the vehicle is in motion. In other embodiments, the mobile computing device includes logic that causes such a popup to be displayed to a user whenever the sensor detects vehicle motion, regardless of whether the user has launched the driver log application.

A mobile computing device for fleet telematics including a display and a controller configured to present an hours of service/driver log application to a user, where when the driver log application is running, the controller is configured to highlight any violations in red.

A mobile computing device for fleet telematics including a display, a controller and an hours of service/driver log application, wherein after a driver has used the mobile computing device to enter their status as on duty and the mobile computing device is logically coupled to a vehicle data bus, the controller is configured to include a popup on the display that alerts the driver when the driver is approaching their on duty limit. In one embodiment the popup is activated when the driver has 1 hour remaining, recognizing that such a popup can be activated based on a different time remaining. In one embodiment the warning popup is orange. In a related embodiment, a red popup is displayed prominently when the duty hours have been exceeded. Such colors are exemplary.

A mobile computing device for fleet telematics including a display and a controller configured to present an hours of service/driver log application to a user, wherein after a driver has logged onto the mobile computing device and launched the driver log application, a home screen of the driver log application includes an information pane that presents to the user an icon that when selected prompts the user to confirm their past driver's logs. Such confirmation is a regulatory requirement. In an exemplary embodiment, the home screen also displays at least the current day's log in at least one of a grid and a text format.

A mobile computing device for fleet telematics including a display and a controller configured to present an hours of service/driver log application to a user, wherein after a driver has logged onto the mobile computing device and launched the driver log application, a home screen of the driver log application includes an information pane that presents to the user an icon that when selected prompts the user to verify edits that the fleet operator has made to their driver's logs. The driver log application is designed such that a driver cannot edit their own driver logs. When a driver determines their logs as reported in the driver log application has an error, the driver must request the fleet operator to perform the edit. The edited driver log will be conveyed to the mobile computing device via a data link, and the driver will use the mobile computing device to confirm that the edited log is now correct. In an exemplary embodiment, the home screen also displays at least the current day's log in at least one of a grid and a text format.

A mobile computing device for fleet telematics including a display and a controller configured to present an hours of service/driver log application to a user, wherein after a driver has logged onto the mobile computing device and launched the driver log application, a home screen of the driver log application includes an icon that enables the user to select from a one day view and a seven (or eight) day view, where the corresponding driver logs are also displayed on the home page. In an exemplary embodiment, the icon is a toggle.

A mobile computing device for fleet telematics including a display and a controller configured to present an hours of service/driver log application to a user, wherein after a driver has logged onto the mobile computing device and launched the driver log application, a home screen of the driver log application includes an icon that enables the user to select from a grid view of their logs to a list view of their logs, where the corresponding driver logs are also displayed on the home page. In an exemplary embodiment, the icon is a toggle.

A mobile computing device for fleet telematics including a display and a controller configured to present an hours of service/driver log application to a user, wherein after a driver has logged onto the mobile computing device and launched the driver log application, a home screen of the driver log application includes an information pane that presents a plurality of icons to the user, where the icons control a plurality of functions, the functions including: enabling the user to confirm their logs; enabling a user to confirm edits to their logs, enabling the user to update their load information, and enabling the user to change their duty status. In an exemplary embodiment, the home screen also displays at least the current day's log in at least one of a grid and a text format.

A mobile computing device for fleet telematics including a display and a controller configured to present an hours of service/driver log application to a user, wherein after a driver has logged onto the mobile computing device and launched the driver log application, the driver log application determines if that driver has any unconfirmed drivers logs, and if so, the driver log application causes a popup to be displayed over the home screen of the driver log application, where the popup asks the user if they wish to confirm their logs. If the user selects yes, the driver log application displays the logs to be confirmed. If the user selects no, the driver log application displays the home screen of the driver log application. In an exemplary embodiment, the home screen also displays at least the current day's log in at least one of a grid and a text format.

A mobile computing device for fleet telematics including a display and a controller configured to present an hours of service/driver log application to a user, wherein after a driver has logged onto the mobile computing device and launched the driver log application, a home screen of the driver log application includes at least the current day's log in at least one of a grid and a text format, in which log entries corresponding to hours in compliance are indicated in green, and log entries corresponding to hours not in compliance are indicated in red. In an exemplary embodiment, log entries corresponding to hours not on duty because the vehicle is being operated as a personal conveyance (a different duty status) are indicated in blue.

A mobile computing device for fleet telematics including a display and a controller configured to present an hours of service/driver log application to a user, wherein after a driver has logged onto the mobile computing device and launched the driver log application, a home screen of the driver log application includes at least the current day's log in at least one of a grid and a text format, and which displays the drivers current totals for the following categories: time spent driving, time spent on duty, miles driven, and miles driven using the vehicle as a personal conveyance (a different duty status).

Exemplary Tablets Including a Messaging Application

The following paragraphs discuss various different embodiments of a mobile computing device, such as device 100, implementing a messaging application.

A mobile computing device for fleet telematics including a display, a speaker (or a speaker output connected to a vehicle speaker) and a controller configured to implement the function of determining if the vehicle is in motion when a new message is received, and if so, to convert the message to speech and audibly present the message to the driver, to avoid distracting the driver with a text message.

A mobile computing device for fleet telematics including a display, and a controller configured to implement the function of monitoring the vehicle's current location using an integrated position sensor or a position sensor logically coupled to the mobile computing device, such that when the vehicle's current position corresponds to a predefined location or geo-fenced area, a predefined message associated with the location is presented to the driver. In at least one embodiment the predefined message is audibly presented to the driver. In at least one embodiment the message is added to the driver's message queue, to be read after the vehicle comes to a stop. A tone can be used to alert the driver of the delivery of a message to be read when the vehicle has stopped. Such location specific or geo-fenced messages can be used to provide drivers with specific instructions when they arrive at a particular location. For example, when a driver arrives at a customer's location, a message can be presented to the driver providing the driver with specific instructions for interacting with that customer (proceed to loading dock A, contact customer representative B, etc.). Note that such location specific messages can be defined after a truck has been dispatched and is in route, so long as the location/geo-fence and message are defined and forwarded to the tablet before the truck arrives at the designated location.

A mobile computing device for fleet telematics including a display and a controller configured to implement the function of determining if device is connected to a wireless network that can be used to send or receive messages, such that if no connection is present and a driver attempts to send a message, a popup will alert the driver that the message cannot be sent. In at least one embodiment the message will be stored until a wireless data link is present.

Exemplary Tablets Including a Driver Behavior Application

The following paragraphs discuss various different embodiments of a mobile computing device, such as device 100, implementing a driver feedback application. Such applications are used to monitor and report driver behavior, such as idling, speeding, hard braking, and other factors that can be used to qualitatively measure driver performance.

A mobile computing device for fleet telematics including a display and a controller configured to execute a driver behavior monitoring application whenever a driver has logged onto the mobile computing device, the driver behavior monitoring application presenting information to the driver regarding his driving behavior as either an icon or a text (or both) on the display at all times, unless the driver is using an inspection application or a driver log application. In an exemplary embodiment the information highlights behavior the driver needs to focus on improving in the current driving session, based on past performance.

A mobile computing device for fleet telematics including a display and a controller configured to execute a driver behavior monitoring application whenever a driver has logged onto the mobile computing device. While the driver behavior monitoring application is running, driver behavior information is separated into reportable data and advisory data, based on predetermined parameters for a specific driving metric. The advisory data will be used to generate data to be displayed to the driver during vehicle operation, while the reportable data will be conveyed to the fleet owner via a data link. In an exemplary embodiment, the data metrics include one or more of excessive idle, excessive speed events, excessive hard braking events, excessive hard cornering events, lack of use of cruise control, inefficient shifting behavior, and over use of accessory equipment (which can reduce MPG). Whenever an event triggers the collection of advisory data, a popup is presented to the driver indicating that undesirable yet non reportable data has been collected due to the driver's behavior (the popup will graphically and/or textually define the undesired behavior). In some embodiments a similar popup is displayed whenever an event triggers the collection of reportable data. In an exemplary embodiment advisory data is associated with an orange, yellow, or blue color scheme, and reportable data is associated with a red color scheme.

A mobile computing device for fleet telematics including a display and a controller configured to execute a driver behavior monitoring application whenever a driver has logged onto the mobile computing device. Upon execution, the driver behavior monitoring application will review previous data associated with that driver, and determine a specific driver behavior metric to present to the driver as a goal for improvement in a current driving session. In one embodiment that goal will be displayed to the driver on a homepage or desktop of the mobile computing device, where icons for telematics applications stored on the device are presented to the user. In one embodiment that goal will be displayed to the driver in an information pane while a navigation application is running. In one the embodiment the driver behavior monitoring application is configured to select that goal based on identifying the metric from the driver's most recent driving session corresponding to the worst aspect of the driver's last driving session. In one the embodiment the driver behavior monitoring application is configured to select that goal based on identifying one metric from a plurality of the driver's past driving sessions corresponding to the worst aspect of the driver's cumulative behavior during those driving sessions. In one the embodiment the driver behavior monitoring application is configured to select a goal communicated to the mobile computing device from a fleet operator's back office via a data link.

A mobile computing device for fleet telematics including a display and a controller configured to execute a driver behavior monitoring application whenever a driver has logged onto the mobile computing device. Upon execution, the driver behavior monitoring application determines if any trigger definitions have been received at the mobile computing device from a fleet operator's back office via a data link. If so, those trigger definitions are implemented for the current and any future driver monitoring sessions. A fleet operator can use those trigger definition to adjust settings in the driver behavior monitoring application relative to different metrics. For example, a fleet operator may adopt a new idle time standard that is lower than a previously adopted standard and the trigger definition can be used to change the idle time setting in the driver behavior monitoring application. In at least some embodiments, the trigger definition is defined in context of a geographical location. For example, a fleet operator may recognize that high traffic conditions in a certain area will lead to an increase in the number of hard braking events, because commuters continually dart in front of the fleet vehicles. The fleet operator can selectively change the settings of the driver behavior monitoring application for hard braking events in that location to reflect the realities of traffic conditions. The driver behavior monitoring application can similarly be configured to apply such trigger definitions to the current driving session if such trigger definitions are received over a data link during the current driving session.

A mobile computing device for fleet telematics including a display and a controller configured to execute a driver behavior monitoring application whenever a driver has logged onto the mobile computing device. Upon execution, the driver behavior monitoring application will present to the user via a popup or other display the option to review reportable events from the immediately preceding driving session, in order to offer the driver an ability to explain or contest a reportable event. For example, based on traffic conditions, a hard braking event may simply represent a driver responding appropriately to traffic conditions outside his control. If the driver does wish to contest a reportable event, the driver behavior monitoring application prompts the driver to enter a brief explanation, and the driver behavior monitoring application forwards that message to the fleet operator's back office via a data link. In a related embodiment, the driver behavior monitoring application will present to the user via a popup or other display the option to review reportable events from the current driving session in response to the driver attempting to log off of the device or change his duty status.

The following paragraphs discuss various different inputs that can be used by a mobile computing device, such as device 100, when implementing a driver feedback application. Exemplary devices are equipped with, or logically connected to, an array of accelerometers and a GPS receiver, which together are used to monitor driver practices, including idle time events (leaving the truck idling for longer than a threshold amount of time), maximum speed events (driving over the speed limit) and overly strenuous application of the brakes (hard braking). In one preferred embodiment, overly fast cornering is also detected and reported. Significantly, in some embodiments, device 100 is to report certain incidents only to the driver. This is an important practice for gaining driver cooperation for the new system, and for reducing driver anxiety.

In one preferred embodiment, each driver is provided with an RFID tag, which can be scanned into device 100, or a secret pin number to identify him or herself to the tablet. As the driving performance may be important to a driver's career development, it is important to have a system for unerringly identifying the driver credited with the driving performance. Other applications, such as the driver log application and inspection application, will similarly employ verifiable credentials. In at least one embodiment, the tablet cannot be used without first logging onto the tablet using verifiable credentials.

It has been observed that there are some roadway locations where most drivers do engage in hard braking, simply because of the nature of that portion of roadway. Thus device 100 can receive instructions over a data link to ignore hard braking events from certain locations. In one exemplary embodiment, a fleet operator will define such locations using geofencing, and send those geofenced locations over a data link to the fleet operator's tablets. The tablet and backend system are designed to allow for such updates. Such definitions are used by the driver coaching application on the tablet, such that hard braking reporting or hard cornering reporting is ignored from those geofenced locations.

In one preferred embodiment of device 100, each driver is prompted at the end of his or her shift to alert the system operator to any unusual incidents occurring during their shift. For example, if the driver had to brake hard to avoid hitting an errant school bus, he might feel quite slighted if this was held against him in the system statistics.

Other Exemplary Tablets Configurations

The following paragraphs discuss other various different embodiments of a mobile computing device, such as device 100, implementing applications that do not fall into the categories above.

A mobile computing device for fleet telematics including a display and a controller configured to enable a driver to selectively open a plurality of driver specific applications whenever a driver has logged onto the mobile computing device. The default screen presented to the user will display a plurality of tiles, each tile corresponding to a driver specific application. Each such tile will identify the driver specific application, and will also display information uniquely corresponding to the driver currently logged onto the tablet related to that application. In one exemplary embodiment, the home screen or default screen will display a tile corresponding to a driver's log application, and that tile will display how many hours the driver can operate and remain in compliance with the Hours of Service regulations. In one exemplary embodiment, the home screen or default screen will display a tile corresponding to a driver's log application, and that tile will display whether or not any previously completed driver's logs need to be reviewed by the driver. In one exemplary embodiment, the home screen or default screen will display a tile corresponding to a message application, and that tile will display how many messages the driver has received, and when the message application was last updated. In some embodiments, the subject line of the message will be displayed in the tile. If too many messages have been received to display all the subject lines, only the most recent subject lines will be displayed. In one exemplary embodiment, the home screen or default screen will display a tile corresponding to a driver behavior or driver coaching application, and that tile will display at least one a cumulative performance ranking of the driver based on past driving sessions, and a performance improvement goal for the current driving session. In one exemplary embodiment, the home screen or default screen will display a tile corresponding to a vehicle inspection application, and that tile will display whether or not any previously completed inspection reports need to be reviewed by the driver.

A mobile computing device for fleet telematics including a display and a controller configured to present a plurality of applications to a user on a home screen of the device upon after turning the device on, wherein information unique to the operator logged onto the device and the application are presented on the home screen. In one embodiment the applications are present on the display as tiles, generally rectangular boxes that identify the application by name and include user specific application tied to the user who has logged onto the device. In one embodiment one of the applications is a driver's log application, and the drivers log tile includes the drivers remaining hours of service. In one related embodiment the drivers log tile informs the driver if he has any logs to confirm. A "thumbs up" icon can be used to indicate drive logs need to be confirmed. In one related embodiment the drivers log tile informs the driver if he has any logs to verify. A pen and paper icon can be used to indicate drive logs need to be confirmed. In one embodiment the home screen also includes an on duty/off duty tile. In one embodiment one of the applications is a message application, and the message tile includes a brief description of the message. In one related embodiment the message tile includes a truck icon next to each subject line relating to a load based message. In one embodiment each application tile includes information presented in a color theme unique to the application, and the color theme is duplicated within the application. The color theme can be a specific color of text. The color theme can be specific colors of icons in the tile and in the application. Inside of the application the color theme can include a bar or border presented to the user. In one embodiment the color them is an upper bar on the upper edge of the display. In one embodiment blue is used as the theme for the driver log application. In one embodiment green is used as the theme for the message application. In one embodiment red is used as the theme for the navigation application. In one embodiment yellow is used as the theme for the navigation application. In one embodiment yellow is used as the theme for the inspection application. In one embodiment one of the applications is a navigation application, and the navigation tile includes one or more of the following types of information: heading, ETA, and destination. In one embodiment one of the applications is an inspection application, and the inspection tile includes a truck icon combined with a magnifying glass icon. In one embodiment that icon is duplicated in the inspection application. In related embodiment the inspection tile includes one or more of the following types of information: asset info, last inspection info, if any defects were noted in last inspection (in one embodiment the number of defects are noted, in one embodiment if the defect is serious the tile informs the user not to driver the vehicle), whether any previous inspections need to be uploaded. In one related embodiment if a defect noted in the last inspection causes the vehicle to be unsafe to drive a red triangular icon with an exclamation point in the center is displayed in the inspection tile on the device home screen. In one related embodiment if a defect was noted in the last inspection but the vehicle can still be driven a yellow triangular icon with an exclamation point in the center is displayed in the inspection tile on the device home screen. In one related embodiment if no defect was noted in the last inspection a green checklist is displayed in the inspection tile on the device home screen. In one related if an image was taken during an inspection and the image requires Wi-Fi to upload that information is displayed in the inspection tile on the device home screen. In one related embodiment, if the device is currently not docked such that the device does not recognize the vehicle to be inspected, the user is prompted to dock the device to retrieve the vehicle ID.

A mobile computing device for fleet telematics including a display, an RFID reader, and a controller configured to prompt a user to scan their unique RFID token issued to the driver by the fleet operator to unlock the mobile computer device to allow the driver to access any applications stored on the mobile computing device. In an exemplary embodiment a user cannot access a driver log application without being prompted to scan their RFID token. In an exemplary embodiment a user cannot access an inspection application without being prompted to scan their RFID token. In an exemplary embodiment a user cannot access any applications without being prompted to scan their RFID token.

Referring once again to FIG. 7, in one embodiment device 100 includes the following telematics applications that can be selected by a user: driver log application 114a, inspection application 114b, navigation application 114c, driver behavior monitoring driving application 114d, and 2-way messaging application 114e.

FIG. 11 is an enlarged view of the tile for driver behavior monitoring driving application 114d of FIG. 7. In one exemplary embodiment, that tile will display at least one a cumulative performance ranking of the driver based on past driving sessions, and/or a performance improvement goal for the current driving session. In FIG. 11, the tile for driving application 114d instructs the driver that their performance goal is to improve their idle metric during their current driving session (i.e., to work on reducing the amount of time the vehicle is idling). Note that the screen shown in FIG. 7 (and in enlarged view in FIG. 11) is presented to a driver when they turn on the tablet at the start of their driving shift. Based on driving metrics collected from prior driving sessions, the performance goal shown in FIG. 11 is presented to the driver, even before the driver actively selects the driving performance application to obtain more detailed driving performance information. Note that this performance goal can also be presented to the driver while the driver is operating the vehicle, using the information pane of the navigation application, as shown in FIG. 10.

FIG. 12 is an enlarged view of the tile for driver log application 114a of FIG. 7. In one exemplary embodiment, that tile will display at least one of an on duty status (such as on duty driving) and a summary of the amount of available on duty time the driver has before violating the hours of service rules. Note that the screen shown in FIG. 7 will be presented to a user when they log into the tablet (device 100), using either a driver card read by the RFID card reader, or a unique PIN, or a combination thereof. The screen of FIG. 7 can then be customized to the specific driver. The driver will also encounter this screen when navigating through the tablet, such as when the driver has stopped driving, and is about to send a 2-way message, or use the inspection application, or make an entry to the driver log application. This screen would also be presented when the driver is about to launch the navigation application and start driving. Note that the driver unique messages on the tile for driver log application 114*a* (duty status and/or duty time remaining) can also be presented to the driver while the driver is operating the vehicle, using the information pane of the navigation application, as shown in FIG. 10.

FIG. 13 is an enlarged view of the tile for 2-way messaging application 114*e* of FIG. 7. In one exemplary embodiment, that tile will display a summary of as many unread messages as can be displayed in the tile, without resizing the tile. If desired, different icons can be provided for different message types. Envelope icons are shown for general messages, and a truck icon is used to denote a load specific message. As noted above, the screen shown in FIG. 7 will be presented to a user when they log into the tablet (device 100), thus the messages summarized in the tile for 2-way messaging application 114*e* are customized for the driver that is logged in. Note that the driver unique messages on tile 114*a* (summary of messages and message icons) can also be presented to the driver while the driver is operating the vehicle, using the information pane of the navigation application, as shown in FIG. 10. In a related embodiment, when a message is received while the driver is driving, the message is converted to audio and played for the driver. Yet another type of information message that can be displayed in the tile for 2-way messaging application 114*e* is an indication of whether a wireless data connection is active, such that messages can be sent and received at the current time.

FIG. 14 is an enlarged view of the tile for inspection application 114*b* of FIG. 7. In one exemplary embodiment, that tile will display an indication of whether the last completed inspection included an defects. In a related embodiment, that tile will display an indication of whether the last completed inspection has been successfully upload (this requires that the tablet be coupled to a network, generally via a wireless connection (cellular or Wi-Fi are exemplary, but not limiting wireless data links).

With respect to the plurality of different telematics applications on device 100 of FIG. 7, in at least one embodiment, the color theme for each application is different, such that text, menu bars, and other graphical elements in different applications have different colors (such as blue for logs, yellow for inspection, green for messaging, red for navigation, and orange for driver behavior, noting such color choices are exemplary, and not limiting).

Assuming a blue theme is selected for the driver log application, the theme can be implemented such that a blue bar is displayed across the top of the screen in that application. Icons in the navigation pane are presented in blue. Exemplary icons in the driver application can be presented in the color selected for the theme. A thumbs up icon is used to enable the driver to confirm past logs. A pen and paper icon is used to enable the driver to verify edits to logs. The edits are approved by the fleet operator back office and the edits logs are wirelessly conveyed to the tablet for the driver to review. A truck icon is used to enable the driver to update their load information. A gear icon is used to run a self-test to verify that the unit is operating correctly and that electronic logs can be used in lieu of paper logs. A calendar icon is used to enable the driver to change their duty status.

Assuming a green theme is selected for the messaging application, the theme can be implemented such that a green bar is displayed across the top of the screen in that application. Icons in the navigation pane are presented in green. Exemplary icons in the messaging application can be presented in the color selected for the theme. Menu items or action icons, such as New Message, are displayed in green text boxes. A truck icon is used to indicate messages related to loads in the in box. In the message pane, where the subject line or a portion of the message is displayed in a quick view, some message types have a brief descriptor in a colored text box. All load related messages share a common color. Load descriptors include load assignment (shown here) and stop information. Red text boxes are used for messages related to pre-planning (pre plan descriptor). Such colors are exemplary.

Assuming a yellow theme is selected for the inspection application, the theme can be implemented such that a yellow bar is displayed across the top of the screen in that application. Menu items or action icons, such as New Inspection, are displayed in yellow text boxes. Yellow top panel and yellow action/menu buttons in inspection application. A yellow truck/magnifying glass icon can be used to enable inspection functions to be selected. Such colors are exemplary Exemplary GPS Device with Onboard Computing Environment FIG. 15 is a functional block diagram of an exemplary telematics device added to an enrolled vehicle to be used in connection with one or more of the mobile computing devices discussed above.

An exemplary telematics unit 160 includes a controller 162, a wireless data link component 164, a memory 166 in which data and machine instructions used by controller 162 are stored (again, it will be understood that a hardware rather than software-based controller can be implemented, if desired), a position sensing component 170 (such as a GPS receiver), and a data input component 168 configured to extract vehicle data from the vehicle's data bus and/or the vehicle's onboard controller (noting that the single input is exemplary, and not limiting, as additional inputs can be added, and such inputs can be bi-directional to support data output as well).

The capabilities of telematics unit 160 are particularly useful to fleet operators. Telematics unit 160 is configured to collect position data from the vehicle (to enable vehicle owners to track the current location of their vehicles, and where they have been) and to collect vehicle operational data (including but not limited to engine temperature, coolant temperature, engine speed, vehicle speed, brake use, idle time, and fault codes), and to use the RF component to wirelessly convey such data to vehicle owners. The exemplary data set discussed above in connection with calculated loaded cost per mile can also be employed. These data transmission can occur at regular intervals, in response to a request for data, or in real-time, or be initiated based on parameters related to the vehicle's speed and/or change in location. The term "real-time" as used herein is not intended to imply the data are transmitted instantaneously, since the data may instead be collected over a relatively short period of time (e.g., over a period of seconds or minutes), and transmitted to the remote computing device on an ongoing or intermittent basis, as opposed to storing the data at the vehicle for an extended period of time (hour or days), and transmitting an extended data set to the remote computing device after the data set has been collected. Data collected by telematics unit 160 can be conveyed to the vehicle owner using RF component 164. If desired, additional memory can be included to temporarily store data id the RF component cannot transfer data. In particularly preferred embodiments the RF components is GSM or cellular technology based.

Exemplary Fleet Management System with in-Vehicle and Remote Components

FIG. 16 is a functional block diagram of an exemplary system 109 including the telematics tablet of FIG. 2 and the telematics device of FIG. 15 installed in a vehicle, which is wirelessly coupled to a remote computer network implementing a fleet management software application. Generally, system 109 will include a plurality of vehicles 105, each equipped with the telematics tablet of FIG. 2 and the telematics device of FIG. 15.

Device 100 (the tablet) is connected to a dock 101. While not specifically shown, it should be understood that dock 101 is connected to a power supply in the vehicle (such as the battery) to energize/recharge the tablet. In some embodiments, dock 101 is also logically coupled to a vehicle data bus 103, so device 100 can acquire data from the vehicle necessary for proper operation of applications on device 100. In other embodiments, dock 101 does not directly connect to the vehicle data bus, but does so through telematics device 160, which is logically coupled to vehicle data bus 103. In such embodiments, telematics device 160 enables device 100 to acquire data from vehicle data bus 103. Generally as described above, telematics box 160 also provides location data input that is required for proper operation of applications on device 100, and a wireless data link (cellular in an exemplary but not limiting embodiment) to a remote computing network 107. A fleet management application accessible via network 107 is used to implement on or more of the following functions: defining geo-fences, zones or locations used by an application on device 100, generating messages to be sent to a specific driver/vehicle, reviewing messages received from a specific driver/vehicle, reviewing and/or storing driver logs received from a specific driver/vehicle, reviewing and/or storing inspection reports received from a specific driver/vehicle, reviewing and/or storing driver performance logs received from a specific driver/vehicle.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A tablet mobile computing device for fleet telematics, comprising:
   (a) a processor;
   (b) a non-transitory, physical memory medium logically coupled to the processor, the memory medium having a first set of machine instructions stored thereon that when executed by the processor implement a verified vehicle inspection application for a virtual inspection of a vehicle having a plurality of RFID tags place on the vehicle exterior and a second set of machine instructions stored thereon that when executed by the processor implement a map display and navigation program;
   (c) a touch screen display logically coupled to the processor, upon which a graphical user interface (GUI) is displayed to a user, the GUI having a first button to enable a user to activate verified inspection application and having a second button to enable a user to activate the map display and navigation program;
   (d) a ruggedized impact resistant housing suitable for industrial environments, the housing having a generally cuboid form factor;
   (e) an RFID reader disposed within the housing and logically coupled to the processor, the RFID reader including an RF coil that extends substantially along a first perimeter edge of the housing, and does not extend around all the perimeter of the housing, thereby creating a preferred orientation for a user to position the tablet mobile computing device, for communicating to an RFID tag; and
   (f) wherein said verified inspection application responds to communication with each RFID tag on the vehicle exterior by displaying a message on the GUI for the user to enter information regarding the visual inspection.

2. The tablet mobile computing device of claim 1, further being in the form of a solid rectangle having a first, second, third and fourth perimeter edge, and wherein the RFID reader comprises a second RF coil, the second RF coil that extends substantially along second perimeter edge of the housing, and wherein neither the third nor the fourth perimeter edges have an RF coil extending substantially along the perimeter edge.

3. The tablet mobile computing device of claim 2, wherein the first perimeter edge and the second perimeter edge are parallel to one another.

4. The tablet mobile computing device of claim 2, wherein the first perimeter edge and the second perimeter edge are disposed orthogonal to one another.

5. The tablet mobile computing device of claim 1, wherein the RF coil extends along a portion of a second perimeter edge of the housing, and the first perimeter edge and the second perimeter edge are disposed orthogonal to one another.

6. The tablet mobile computing device of claim 5, wherein the RF coil extends along a portion of a third perimeter edge of the housing, and the second perimeter edge and the third perimeter edge are disposed parallel to one another.

7. The tablet mobile computing device of claim 1, further comprising an indicator light disposed along a perimeter edge of the housing, generally adjacent to the RF coil, the indicator light providing a user an indication of how to orient the tablet in order to enable the RF coil to interact with an RFID tag.

8. The tablet mobile computing device of claim 7, wherein the machine instructions stored in the memory media, when executed by the processor, implement the function of energizing the light only when a user has selected the verified vehicle inspection application via the touch screen display, such that the light will not be energized unless the inspection application is running.

9. The tablet mobile computing device of claim 1, further comprising a high intensity flashlight disposed along a perimeter edge of the housing, and wherein the machine instructions stored in the memory media, when executed by the processor, implement the function of energizing the flashlight only when a user has selected the verified vehicle inspection application via the touch screen display, such that the flashlight will not be energized unless the verified vehicle inspection application is running.

10. The tablet mobile computing device of claim 1, further comprising a digital camera, and wherein the machine instructions stored in the memory media, when executed by the processor, implement the function of actuating the camera only when a user has selected an inspection application via the touch screen display, such that the camera will not be enabled unless the inspection application is running.

11. The tablet mobile computing device of claim 1, wherein the machine instructions stored in the memory media, when executed by the processor, implement at least one additional fleet telematics related application selected from a group of fleet telematics related applications consisting of:
(a) an AOBRD compliant driver log application;
(b) an EOBR compliant driver log application;
(c);
(d) a two-way messaging application that provides text to speech conversion when a vehicle the tablet mobile computing device is logically coupled to is in motion;
(e) and
(f) a driver behavior monitoring application.

12. A tablet mobile computing device for fleet telematics, comprising:
(a) a processor;
(b) a non-transitory, physical memory medium logically coupled to the processor, having machine instructions stored thereon that when executed by the processor implement a plurality of functions, the plurality of functions including a verified vehicle inspection application for a virtual inspection of a vehicle having a plurality of RFID tags placed on the vehicle exterior;
(c) a touch screen display logically coupled to the processor upon which a graphical user interface (GUI) is displayed to a user, the user being able to activate the vehicle inspection application from the GUI;
(d) a ruggedized impact resistant housing suitable for industrial environments, the housing having a generally cuboid form factor;
(e) a high intensity flashlight disposed along a perimeter edge of the housing, wherein the machine instructions stored in the memory media, when executed by the processor, implement the function of energizing the flashlight only when the verified vehicle inspection application is running; and
(f) wherein said verified inspection application communicating with each RFID tag on the vehicle exterior by displaying a message on the GUI for the user to enter information regarding the visual inspection.

13. A tablet mobile computing device for fleet telematics, adapted for use in inspecting a vehicle onto which RFID tags have been installed on the exterior of the vehicle, comprising:
(a) a processor;
(b) a non-transitory, physical memory medium having machine instructions stored thereon that when executed by the processor implement a plurality of functions, the plurality of functions including a vehicle inspection application;
(c) an RF tag reader;
(d) a touch screen display logically coupled to the processor upon which a graphical user interface (GUI) is displayed to a user, the user being able to activate the vehicle inspection application from the GUI;
(e) a ruggedized impact resistant housing suitable for industrial environments, the housing having a generally cuboid form factor; and
(f) a digital camera, wherein the vehicle inspection application, when executed by the processor, implements the function of responding to the RFID tag reader reading of an RFID tag, by using the touch screen display to query a user about the status of a portion of the exterior of the vehicle, and wherein the machine instructions stored in the memory media enable the camera only when the vehicle inspection application is running.

14. A tablet mobile computing device for fleet telematics, adapted for use in inspecting a vehicle onto which RFID tags have been installed on the exterior of the vehicle, comprising:
(a) a processor;
(b) a non-transitory, physical memory medium having machine instructions stored thereon that when executed by the processor implement a plurality of functions, the plurality of functions including:
(i) a verified vehicle inspection application; and
(ii) a two-way messaging application that provides text to speech conversion when a vehicle the tablet mobile computing device is logically coupled to is in motion; and
(c) a touch screen display logically coupled to the processor upon which a graphical user interface (GUI) is displayed to a user, the user being able to selectively activate the plurality of functions from the GUI;
(d) an RFID tag reader;
(e) a ruggedized impact resistant housing suitable for industrial environments, the housing having a generally cuboid form factor; and
(f) wherein the verified vehicle inspection application machine instructions stored in the memory media, when executed by the processor, implements the function of responding to the RFID tag reader reading of an RFID tag, by using the touch screen display to query a user about the status of a portion of the exterior of the vehicle.

15. The tablet mobile computing device of claim 14, wherein the plurality of functions further comprise a navigation application.

16. The tablet mobile computing device of claim 14, wherein the plurality of functions further comprise a driver log application.

17. The tablet mobile computing device of claim 16, wherein the driver log is EOBR compliant.

18. The tablet mobile computing device of claim 16, wherein the driver log is AOBRD compliant.

19. The tablet mobile computing device of claim 14, wherein the plurality of functions further comprise a driver behavior monitoring application.

20. The tablet mobile computing device of claim 19, wherein the plurality of functions further comprises a driver log application.

* * * * *